(12) United States Patent
Liu et al.

(10) Patent No.: US 10,150,889 B2
(45) Date of Patent: Dec. 11, 2018

(54) POLY FLUORINE-CONTAINING SILOXANE COATINGS

(71) Applicant: HONEYWELL INTERNATIONAL INC., Morris Plains, NJ (US)

(72) Inventors: Ya Qun Liu, Shanghai (CN); Bright Zhang, Shanghai (CN); Huifeng Duan, Shanghai (CN); Wanchao Jiang, Shanghai (CN); Yunzi Jiang, Shanghai (CN); Zhe Ding, Shanghai (CN); David K. Chen, Vancouver, WA (US); Yanming Shen, Shanghai (CN); Wei Jun Wang, Shanghai (CN)

(73) Assignee: Honeywell International Inc., Morris Plains, NJ (US)

( * ) Notice: Subject to any disclaimer, the term of this patent is extended or adjusted under 35 U.S.C. 154(b) by 155 days.

(21) Appl. No.: 14/916,844

(22) PCT Filed: Sep. 8, 2014

(86) PCT No.: PCT/US2014/054481
§ 371 (c)(1),
(2) Date: Mar. 4, 2016

(87) PCT Pub. No.: WO2015/038454
PCT Pub. Date: Mar. 19, 2015

(65) Prior Publication Data
US 2016/0200941 A1 Jul. 14, 2016

Related U.S. Application Data

(60) Provisional application No. 61/878,220, filed on Sep. 16, 2013.

(51) Int. Cl.
C09D 183/08 (2006.01)
C08K 3/36 (2006.01)
C08G 77/24 (2006.01)
C08K 3/38 (2006.01)
C08K 3/22 (2006.01)

(52) U.S. Cl.
CPC .......... C09D 183/08 (2013.01); C08G 77/24 (2013.01); C08K 3/36 (2013.01); *C08K 2003/2227* (2013.01); *C08K 2003/2241* (2013.01); *C08K 2003/2244* (2013.01); *C08K 2003/385* (2013.01)

(58) Field of Classification Search
CPC .............................. C09D 183/04; C08G 77/24
See application file for complete search history.

(56) References Cited

U.S. PATENT DOCUMENTS

| | | |
|---|---|---|
| 3,646,085 A | 2/1972 | Bartlett |
| 4,927,950 A | 5/1990 | Hisamoto et al. |
| 5,288,889 A | 2/1994 | Takago et al. |
| 5,892,086 A | 4/1999 | Buese et al. |
| 6,183,872 B1 | 2/2001 | Tanaka et al. |
| 6,337,133 B1 * | 1/2002 | Akamatsu ............... C03C 17/30 428/410 |
| 6,337,135 B1 | 1/2002 | Yamaguchi et al. |
| 6,649,272 B2 * | 11/2003 | Moore ................. C08G 65/007 427/387 |
| 7,094,471 B2 | 8/2006 | Moore et al. |
| 7,097,910 B2 | 8/2006 | Moore et al. |
| 7,196,212 B2 | 3/2007 | Yamaguchi et al. |
| 7,294,731 B1 | 11/2007 | Flynn et al. |
| 7,335,786 B1 | 2/2008 | Iyer et al. |
| 7,601,428 B2 | 10/2009 | Yamane et al. |
| 7,652,115 B2 | 1/2010 | Dams et al. |
| 7,794,843 B2 | 9/2010 | Yamane et al. |
| 7,829,649 B2 | 11/2010 | Yamane et al. |
| 8,129,435 B2 | 3/2012 | Yamaguchi et al. |
| 8,211,544 B2 | 7/2012 | Itami et al. |
| 8,263,724 B2 | 9/2012 | Yamane et al. |
| 8,268,067 B2 | 9/2012 | Iyer et al. |
| 8,304,571 B2 | 11/2012 | Yamaguchi et al. |
| 9,611,399 B2 * | 4/2017 | Flynn .................... C09D 183/08 |
| 2006/0052565 A1 * | 3/2006 | Yoshioka ............. C09D 183/04 528/10 |
| 2007/0116970 A1 * | 5/2007 | Kato .................... C09D 183/10 428/447 |

(Continued)

FOREIGN PATENT DOCUMENTS

| | | |
|---|---|---|
| CN | 1315483 A | 10/2001 |
| CN | 1703441 A | 11/2005 |

(Continued)

OTHER PUBLICATIONS

International Preliminary Report on Patentability issued in PCT/US2014/054481, dated Mar. 22, 1016, 6 pages.

(Continued)

*Primary Examiner* — Marc S Zimmer
(74) *Attorney, Agent, or Firm* — Faegre Baker Daniels LLP

(57) ABSTRACT

Poly fluorine-containing siloxane coatings having improved hydrophobic and oleophobic properties and solutions for creating such coatings are provided. In some embodiments, the coating includes a polymer having a plurality of Si—O—Si linkages; and at least two fluorine-containing moieties, each attached to at least one of the Si—O—Si linkages. Each fluorine-containing moiety independently includes a linking portion attached to a silicon of one of the Si—O—Si linkages, wherein the linking portion is of a formula selected from the group consisting of: —[CH$_2$]$_a$— where a is an integer from 1 to 10 and —[CH$_2$]$_b$CONH[CH$_2$]$_c$— where b and c are independently an integer from 0 to 10. Each fluorine-containing moiety also independently includes a fluorinated portion attached to the linking portion, wherein the fluorinated portion is selected from a fluorinated-alkyl group having 1-10 carbon atoms and a perfluoro-ether containing organic group.

20 Claims, 1 Drawing Sheet

(56) References Cited

U.S. PATENT DOCUMENTS

| | | |
|---|---|---|
| 2008/0299399 A1 | 12/2008 | Yamaguchi et al. |
| 2009/0197056 A1 | 8/2009 | Yokoi et al. |
| 2009/0238986 A1 | 9/2009 | Gross et al. |
| 2010/0076211 A1 | 3/2010 | Yamane et al. |
| 2010/0190879 A1 | 7/2010 | Ludemann et al. |
| 2011/0098402 A1 | 4/2011 | Yamane et al. |
| 2011/0319581 A1 | 12/2011 | Yamaguchi et al. |
| 2012/0077041 A1 | 3/2012 | Yamane et al. |
| 2012/0148848 A1 | 6/2012 | Martin et al. |
| 2012/0154487 A1* | 6/2012 | Sambhy ............... B41J 2/1606 347/45 |
| 2012/0189843 A1 | 7/2012 | Chang et al. |
| 2012/0270057 A1 | 10/2012 | Yamane et al. |
| 2013/0109261 A1* | 5/2013 | Koene .................. C08J 7/047 442/59 |

FOREIGN PATENT DOCUMENTS

| | | | |
|---|---|---|---|
| CN | 101501046 A | 8/2009 |
| CN | 102464923 A | 5/2012 |
| CN | 20101533818 A | 5/2012 |
| CN | 102504625 A | 6/2012 |
| CN | 102634025 A | 8/2012 |
| CN | 102666759 A | 9/2012 |
| CN | 102686685 A | 9/2012 |
| CN | 102712529 A | 10/2012 |
| EP | 0616012 B1 | 9/1994 |
| EP | 1555249 A1 | 7/2005 |
| EP | 2157120 B1 | 2/2010 |
| JP | 04126521 B2 | 4/1992 |
| JP | 04041659 B2 | 7/1992 |
| JP | H06293782 A | 10/1994 |
| JP | 09111185 A | 4/1997 |
| JP | 11217558 A | 8/1999 |
| JP | 2000119634 A | 4/2000 |
| JP | 2000143991 A | 5/2000 |
| JP | 2000144097 A | 5/2000 |
| JP | 2002053805 A | 2/2002 |
| JP | 4041659 B2 | 12/2002 |
| JP | 2003064348 A | 3/2003 |
| JP | 2004315712 A | 11/2004 |
| JP | 2005146272 A | 6/2005 |
| JP | 2006045159 A | 2/2006 |
| JP | 411080 B2 | 1/2007 |
| JP | 2008088323 A | 4/2008 |
| JP | 2008308628 A | 12/2008 |
| JP | 2009067958 A | 4/2009 |
| JP | 2009144133 A | 7/2009 |
| JP | 2010031184 A | 2/2010 |
| JP | 4666667 B2 | 3/2010 |
| JP | 2010126675 A | 6/2010 |
| JP | 2010165407 A | 7/2010 |
| JP | 046666667 B2 | 4/2011 |
| JP | 04711080 B2 | 6/2011 |
| JP | 4759952 B2 | 8/2011 |
| JP | 04759952 B2 | 8/2011 |
| JP | 2011152681 A | 8/2011 |
| JP | 2011178835 A | 9/2011 |
| JP | 2011208095 A | 10/2011 |
| JP | 04862992 B2 | 1/2012 |
| JP | 4862992 B2 | 1/2012 |
| JP | 05007812 B2 | 8/2012 |
| JP | 2012157856 A | 8/2012 |
| JP | 2012197395 A | 10/2012 |
| JP | 2012211257 A | 11/2012 |
| KR | 2009056888 A | 6/2009 |
| KR | 2011082352 A | 7/2011 |
| KR | 1062564 B1 | 9/2011 |
| KR | 1093577 B1 | 12/2011 |
| TW | 200831941 A | 8/2008 |
| WO | 2005101063 A1 | 10/2005 |
| WO | 2006049020 A1 | 5/2006 |
| WO | 2008120783 A1 | 10/2008 |
| WO | 2010114111 A1 | 10/2010 |
| WO | 2012078956 A1 | 6/2012 |

OTHER PUBLICATIONS

International Search Report and Written Opinion issued in PCT/US2014/054481, dated Dec. 10, 2014, 10 pages.

* cited by examiner

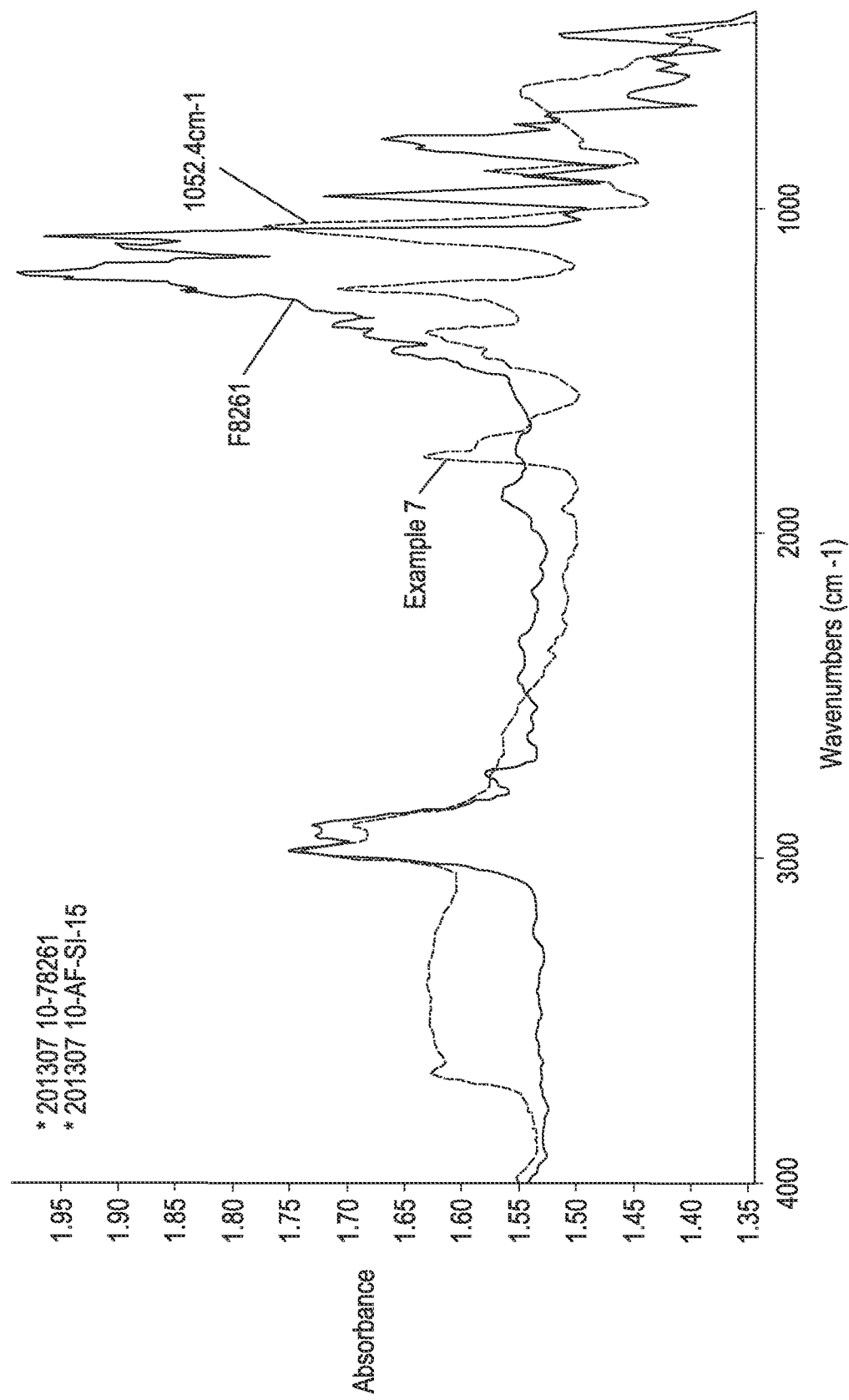

POLY FLUORINE-CONTAINING SILOXANE COATINGS

CROSS-REFERENCE TO RELATED APPLICATION

This application is a national phase application of PCT Application No. PCT/US2014/054481, internationally filed Sep. 8, 2014, which claims the benefit under Title 35, U.S.C. § 119 of U.S. Provisional Application No. 61/878,220, filed Sep. 16, 2013, and the entire specifications of each are incorporated by reference in their entirety.

FIELD OF THE INVENTION

The present disclosure relates generally to poly fluorine-containing siloxane coatings, and more particularly to fluorine-containing polysiloxane coatings having hydrophobic and oleophobic properties for transparent substrates.

DESCRIPTION OF RELATED ART

Polysiloxane coatings are used in the manufacture of touch panels, glass displays, goggles, mirrors, building windows, automobiles, controller touch screens, greenhouses, and photovoltaic components. Improvements in the hydrophobic and oleophobic properties of polysiloxane coatings are desired to provide anti-fingerprint (AFP) properties, such as anti-contamination and auto-cleaning of the coating surface. Polysiloxane coatings having low coefficients of friction to provide good finger sliding are desirable for touch panels and control screens, such as computer and smart phone displays. Polysiloxane coatings can also be used on anti-reflective (AR) coated solar glass (textured), such as in a solar cell.

Compounds containing perfluoropolyether moieties generally have very small surface free energy, providing water and oil repellency and antifouling properties. These compounds are known to be used for treatment agents to make glass or metal substrates oil-repellent, fouling-resistant, and fingerprint resistant.

However, a fluorine-containing compound does not easily bond to other materials. It is known to use a silane coupling agent to adhere a perfluoroether group to a substrate. Exemplary perfluoropolyether containing silane coupling agents include a perfluoropolyether component endcapped with one or more hydrolysahle silane groups such as halogensilanes or alkoxysilanes.

SUMMARY OF THE INVENTION

The present disclosure provides poly fluorine-containing siloxane-based coatings having improved hydrophobic and oleophobic properties. As used herein, poly fluorine-containing siloxane based coatings refers to polysiloxane containing two or more fluorine-containing moieties. The fluorine-containing moieties may be partially or fully fluorinated. Exemplary fluorine-containing moieties include partially and fully fluorinated alkanes and perfluoropolyethers.

The present disclosure relates to multiple fluorine-containing moieties crosslinked through a polysiloxane network. The polysiloxane network may include multiple anchoring points for the fluorine-containing moieties, further improving bonding between the polysiloxane network and the fluorine-containing moieties. The addition of additional fluorine-containing moieties may result in improved hydrophobic and oleophobic properties, as measured by water and oleic acid contact angle.

According to an embodiment of the present disclosure, a composition for forming a poly fluorine-containing siloxane coating is provided. The composition includes a polymer of Formula (I), at least one organic solvent, and optionally at least one additive:

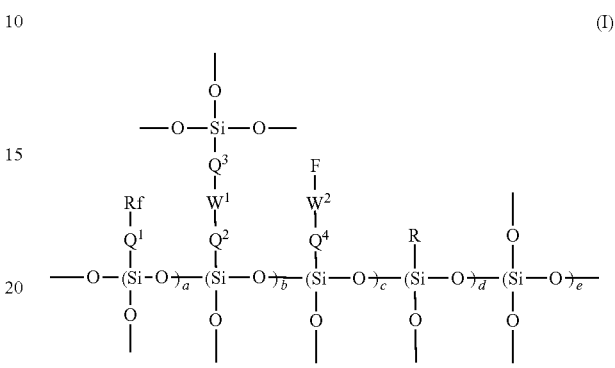

(I)

wherein:
R is a hydrogen atom, an alkyl or aryl group having 1 to 10 carbon atoms, a fluorine-substituted alkyl or aryl group having 1 to 10 carbon atoms;
Rf is a linear or branched perfluoro-alkyl group represented by the formula $F-(C_9F_{2g})-$, where g is an integer from 1 to 10;
$W^1$, $W^2$ are each independently a perfluoroether-containing organic group;
$Q^1$, $Q^2$, $Q^3$, $Q^4$ are each independently an organic linking group linking a Si element to a fluorinated group; and
a, b, c, e are each independently an integer from 0 to 1000, the sum of the integers a, b, and c being greater than or equal to 2

In a more particular embodiment, the at least one additive is selected from the group consisting of water, a crosslinker, a catalyst, nanosize particles, lubricant and a surfactant. In a further more particular embodiment, the crosslinker is selected from the group consisting of polyphosphazene, glycoluril, melamine, benzoguanamine, urea, and combinations thereof; the catalyst is selected from the group consisting of acid catalysts, alkaline catalysts, metal-organic catalysts, tetralkylammonium salt catalyst, and combinations thereof; the lubricant is selected from perfluoropolyether, silicone and combinations thereof; and the nanosize particles are selected from the group consisting of nanosize organic particles, nanosize inorganic particles, and combinations thereof.

According to an embodiment of the present disclosure, a composition for forming a poly fluorine-containing siloxane coating solution is provided including at least one organic solvent and a polymer comprising: a plurality of Si—O—Si linkages; and at least two fluorine-containing moieties, each attached to at least one of the Si—O—Si linkages, wherein each fluorine-containing moiety independently includes: a linking portion attached to a silicon of one of the Si—O—Si linkages, wherein the linking portion is of a formula selected from the group consisting of $-[CH_2]_a-$ where a is an integer from 1 to 10 and $-[CH_2]_bCONH[CH_2]_c-$ where b and c are independently an integer from 0 to 10; and a fluorinated portion attached to the linking portion, wherein the fluorinated portion is selected from a fluorinated-alkyl group having 1-10 carbon atoms and a perfluoroether containing organic group. In one particular embodiment, at least a portion of the Si—O—Si linkages comprise colloidal silica. In one particular embodiment, the composition further comprises a colloidal silica and at least one of the fluorine-containing moieties is a perfluoropolyether.

According to an embodiment of the present disclosure, a method of producing a poly fluorine-containing siloxane coating solution is provided including: forming a solution of at least one organic solvent, at least one siloxane precursor material containing at least one —Si—O—$R^a$ bond, wherein $R^a$ is an alkyl of 1-4 carbons, and optionally at least one additive; reacting the at least one siloxane precursor material in the presence of a catalyst to form a polymer matrix in the solvent, the polymer matrix including: a plurality Si—O—Si linkages; and at least two fluorine-containing moieties, each attached to at least one of the Si—O—Si linkages, wherein each fluorine-containing moiety independently includes: a linking portion attached to a silicon of one of the Si—O—Si linkages, wherein the linking portion is of a formula selected from the group consisting of —[$CH_2$]$_a$— where a is an integer from 1 to 10 and —[$CH_2$]$_b$CONH[$CH_2$]$_c$— where b and c are independently an integer from 0 to 10; and a fluorinated portion attached to the linking portion, wherein the fluorinated portion is selected from a fluorinated-alkyl group having 1-10 carbon atoms and a perfluoroether containing organic group. According to a more particular embodiment, the catalyst is selected from acetic acid, nitric acid, sodium hydroxide, dibutyltindiluarate, acidic colloidal silica, and alkaline colloidal silica.

According to an embodiment of the present disclosure, a method of forming a poly fluorine-containing siloxane coating on a substrate is provided including: dispensing a solution onto the substrate, the solution including an organic solvent, a polymer comprising: a plurality of Si—O—Si linkages; and at least two fluorine-containing moieties, each attached to at least one of the Si—O—Si linkages, wherein each fluorine-containing moiety independently includes: a linking portion attached to a silicon of one of the Si—O—Si linkages, wherein the linking portion is of a formula selected from the group consisting of —[$CH_2$]$_a$— where a is an integer from 1 to 10 and —[$CH_2$]$_b$CONH[$CH_2$]$_c$— where b and c are independently an integer from 0 to 10; and a fluorinated portion attached to the linking portion, wherein the fluorinated portion is selected from a fluorinated-alkyl group having 1-10 carbon atoms and a perfluoroether containing organic group, and optionally at least one additive; and curing the solution to form an optically transparent coating on the substrate. According to a more particular embodiment, the substrate is optically transparent.

According to an embodiment of the present disclosure, a poly fluorine-containing siloxane coated substrate is provided. The coated substrate comprises a substrate and an optically transparent coating disposed on at least one surface of the substrate, the optically transparent coating comprising a polymer, the polymer comprising: a plurality Si—O—Si linkages; and at least two fluorine-containing moieties, each attached to at least one of the Si—O—Si linkages, wherein each fluorine-containing moiety independently includes: a linking portion attached to a silicon of one of the Si—O—Si linkages, wherein the linking portion is of formula selected from the group consisting of —[$CH_2$]$_a$— where a is an integer from 1 to 10 and —[$CH_2$]$_b$CONH[$CH_2$]$_c$— where b and c are independently an integer from 0 to 10; and a fluorinated portion attached to the linking portion, wherein the fluorinated portion is selected from a fluorinated-alkyl group having 1-10 carbon atoms and a perfluoroether containing organic group. According to a more particular embodiment, the substrate is optically transparent.

According to an embodiment of the present disclosure, a solution for forming a coating is provided. The coating solution comprises at least one alcohol of 1-4 carbons, at least one perfluoroether containing polymer of the formula: [$R^a$—O]$_3$—Si—[$CH_2$]$_a$—O—$W_1$—O—[$CH_2$]$_b$—Si—[O—$R^a$]$_3$, wherein $R^a$ is an alkyl of 1-4 carbons; a is from 2 to 10; b is from 2 to 10; and $W_1$ includes at least one —$CF_2$—O—$CF_2$— linkage, and optionally at least one additive. In a more particular embodiment, the coating solution further comprises a fluorinated alkane of 3-10 carbons. In a still more particular embodiment, the fluorinated alkane is 1,1,1,3,3,-penafluorobutane.

BRIEF DESCRIPTION OF THE DRAWINGS

The above-mentioned and other features and advantages of this disclosure, and the manner of attaining them, will become more apparent and the invention itself will be better understood by reference to the following description of embodiments of the invention taken in conjunction with the accompanying drawings, wherein:

FIG. 1 corresponds to the Examples of Group A.1 and shows a comparison of the FTIR spectrum of Example 7 with that of F8261.

Corresponding reference characters indicate corresponding parts throughout the several views. The exemplifications set out herein illustrate exemplary embodiments of the invention and such exemplifications are not to be construed as limiting the scope of the invention in any manner.

DETAILED DESCRIPTION

The present invention relates to poly fluorine-containing siloxane coatings useful for application on glass and other substrates. Poly fluorine-containing siloxane coatings are useful as anti-fingerprint coatings for touch screens and as coatings on anti-reflective textured glass in solar cells. In many instances, the coatings described herein provide high hydrophobicity and high oleophobicity.

A. Compositions for Forming a polysiloxane Coating

According to the present disclosure, the composition includes an organic solvent and a polymer. These polymers are alternatively discussed below in (1) which is a composite chemical structure or (2) which is a word-based description of the chemical structure 1. Compositions Including a Polymer of Formula (I)

In one embodiment, a composition for forming a polysiloxane coating is provided. The composition for forming a polysiloxane coating includes: (a) a polymer of Formula (I); (b) at least one organic solvent; and (c) optionally, additives.

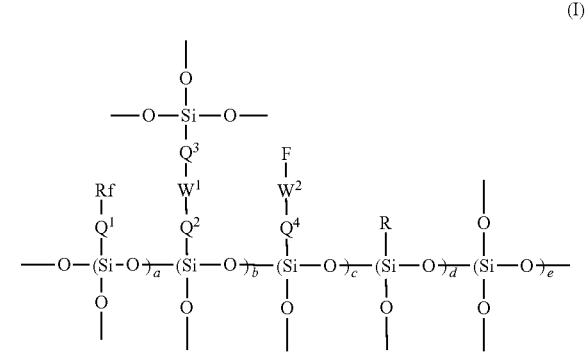

(I)

wherein:

R is a hydrogen atom, an alkyl group having 1 to 10 carbon atoms or an aryl group, or a fluorine-substituted alkyl group having 1 to 10 carbon atoms or a fluorine-substituted aryl group;

Rf is a linear or branched perfluoro-alkyl group represented by the formula F—$(C_gF_{2g})$—, where g is independently an integer from 1 to 10;

$W^1$, $W^2$ are independently a perfluoroether-containing organic group;

$Q^1$, $Q^2$, $Q^3$, $Q^4$ are independently an organic linking group a fluorinated group with a Si element;

a, b, c, d, e are each independently an integer from 0 to 1000, and the sum of the integers a, b, and c is greater than or equal to 2.

In some exemplary embodiments of the polymer of Formula (I), the organic linking groups $Q^1$, $Q^2$, $Q^3$, $Q^4$ are independently represented by a formula selected from the group consisting of: —$CH_2$—, —OCONH—, —COO—, —CONH—, —$CH_2O$—, —$CH(CH_3)$—, —$C(CH_3)_2$—, and —$(Si(CH_3)_2O)_h$—$Si(CH_3)_2$— wherein h is an integer from 0 to 10. In more particular embodiments, the organic linking groups $Q^1$, $Q^2$, $Q^3$, $Q^4$ are independently selected is from: —$CH_2CH_2$—, —$CH_2OCONHCH_2CH_2CH_2$—, —$CONHCH_2CH_2CH_2$—, —$CH_2CH_2COOCH_2$—, and —$CH_2CH_2$—$Si(CH_3)_2O$—$Si(CH_3)_2$—.

In some exemplary embodiments of the polymer of Formula (I), R is selected from the group consisting of: H, $CH_3$ and $CHF_2$.

In some exemplary embodiments of the polymer of Formula (I), g is an integer from 1 to 6, and in a more particular embodiment is selected from 5 and 6.

In some exemplary embodiments of the polymer of Formula (I), the sum of the integers a, b, c, d, and e is greater than 10.

In some exemplary embodiments of the polymer of Formula (I), the perfluoroether-containing organic groups $W^1$, $W^2$ are independently represented by the Formula (II):

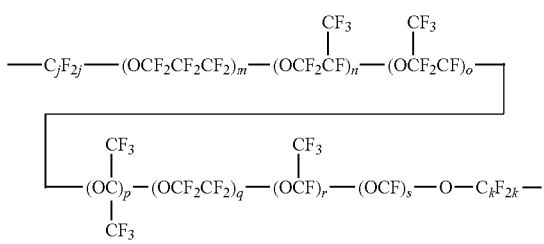

wherein $C_jF_{2j}$ and $C_kF_{2k}$ are independently a linear or branched perfluoro-alkyl group;

m, n, o, p, q, r, s are each independently an integer from 0 to 100; and j, k are independently an integer from 1 to 10.

In some exemplary embodiments of the polymer of Formula (II), the sum of the integers m, n, o, p, q, r, and s is less than 50.

In some exemplary embodiments of the polymer of Formula (I), the perfluoroether-containing organic groups $W^1$ and $W^2$ are independently selected from the groups represented by Formula (III) and Formula (IV):

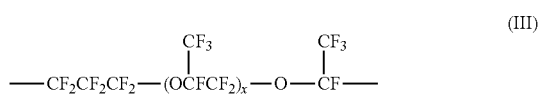

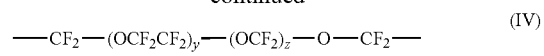

wherein x, y, z are each independently an integer from 0 to 100.

In some exemplary embodiments, the polymer of Formula (I) has a molecular weight from 500 to 50000.

In some exemplary embodiments, the solid weight content of the polymer of Formula (I) is from 0.01% to 50% of the total weight of the composition. In more particular embodiments the solid weight content of the polymer of Formula (I) is 0.1% to 30% of total the weight of the composition.

2. Compositions including a Polymer Containing a Plurality of Si—O—Si Linkages and at least Two-Fluorine Containing Moieties In another embodiment, a composition for forming a polysiloxane coating is provided. The composition includes at least one organic solvent and a polymer. The polymer includes a plurality of Si—O—Si linkages and at least two-fluorine containing moieties, each moiety being attached to at least one of the Si—O—Si linkages.

Each fluorine-containing moiety includes a linking portion attached to a silicon of one of the Si—O—Si linkages and a fluorinated portion attached to the linking portion.

The linking portion may be of the formula —$[CH_2]_a$—, wherein a is an integer as little as 1, 2, 3, 4, 5, as great as 6, 7, 8, 9, 10, or within any range defined between any two of the foregoing values.

The linking portion may be of the formula —$[CH_2]_b$CONH$[CH_2]_c$— where b and c are independently an integer as little as 0, 1, 2, 3, 4, 5, as great as 6, 7, 8, 9, 10, or within any range defined between any two of the foregoing values.

The linking portion may be of a formula selected from the group consisting of —$[CH_2]_a$— and —$[CH_2]_b$CONH$[CH_2]_c$—, wherein a is an integer as little as 1, 2, 3, 4, 5, as great as 6, 7, 8, 9, 10, or within any range defined between any two of the foregoing values and b and c are independently integers as little as 0, 1, 2, 3, 4, 5, as great as 6, 7, 8, 9, 10, or within any range defined between any two of the foregoing values.

The fluorinated portion may be a fluorinated alkyl group having as little as 1 carbon, 2 carbons, 3 carbons, 4 carbons, 5 carbons, as great as 6 carbons, 7 carbons, 8 carbons, 9 carbons, 10 carbons, or within any range defined between any two of the foregoing values.

The fluorinated portion may include a perfluoroether group. An exemplary perfluoroether group is —O—$W_1$—O—, wherein $W_1$ includes at least one —$CF_2$—O—$CF_2$— linkage.

At least one of the fluorine-containing moieties may include a second linking portion of the formula —$[CH_2]_b$— attached to a silicon of one of the Si—O—Si linkages, wherein b is as little as 1, 2, 3, 4, 5, as great as 6, 7, 8, 9, 10, or within any range defined between any two of the foregoing values.

At least one of the fluorine-containing moieties may be represented by Formula (II):

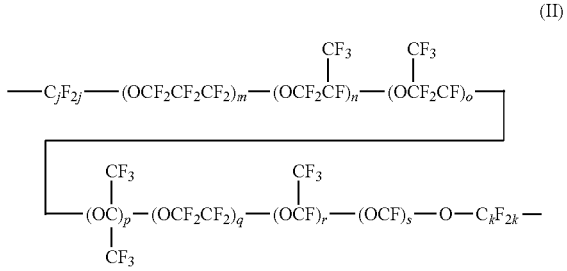

wherein $C_jF_{2j}$ is selected from linear or branched perfluoro-alkyl groups where j is as little as 1, 2, 3, 4, 5, as great as 6, 7, 8, 9, 10, or within any range defined between any two of the foregoing values; $C_kF_{2k}$ is selected from linear or branched perfluoro-alkyl groups where k is as little as 1, 2, 3, 4, 5, as great as 6, 7, 8, 9, 10, or within any range defined between any two of the foregoing values; and m, n, o, p, q, r, s are each independently an integer from 0 to 100, and the sum of the integers m, n, o, p, q, r, and s is greater than 1, In a more particular embodiment, the sum of the integers m, n, o, p, q, r, and s is less than 50.

At least one of the fluorine-containing moieties may be represented by Formula (III):

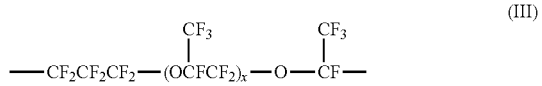

wherein x, y, and z are each independently an integer from 0 to 100.

At least one of the fluorine-containing moieties may be represented by Formula (IV):

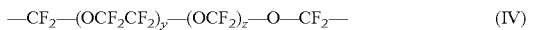

wherein x, y, and z are each independently an integer from 0 to 100.

At least one of the fluorine-containing moieties may selected from a group represented by Formula (III) and a group represented by Formula (IV).

At least one of the fluorine-containing moieties may be of the formula: —$[CH_2]_a$—$[CF_2]_c$—F, wherein c as little as 1, 2, 3, 4, 5, as great as 6, 7, 8, 9, 10, or within any range defined between any two of the foregoing values.

At least one of the fluorine-containing moieties may have a molecular weight as little as 400, 500, 700, 1000, as great as 1250, 1500, 1750, 2000, or within any range defined between any two of the foregoing values. In a more particular embodiment, the at least one fluorine-containing moiety is formed from a perfluoropolyether having a molecular weight as little as 1500, 1750, as great as 1850, 2000, or within any range defined between any two of the foregoing values. In another more particular embodiment, the at least one fluorine-containing moiety is from a silanol terminated polysiloxane having a molecular weight as little as 400, 500, as great as 600, 700, or within any range defined between any two of the foregoing values.

At least a portion of the Si—O—Si linkages may comprise colloidal silica. Exemplary colloidal silica includes nanoparticles and spherical nanoparticles of colloidal silica.

The composition may comprise as little as 0.001 wt. %, 0.01 wt. %, 0.1 wt. %, 0.5 wt. %, as great as 1 wt,%, 5 wt. %, 10 wt. %, 20 wt. % of the polymer, or within any range defined between any two of the foregoing values, based on the total weight of the composition.

3. Organic Solvent

In some exemplary embodiments, the organic solvents are selected from fluorine-containing solvents, non-fluorine-containing solvents, or a combination thereof.

The fluorine-containing solvent may be selected from a perfluoro- or partially fluoro-substituted solvent selected from an alkane, alkene, arene, halogenated-hydrocarbon, ether, ester, ketone, alcohol, carboxylic acid, or a combination thereof. In one embodiment, the fluorine-containing solvent has a boiling point of from 15 to 150° C., more preferably 30 to 90° C. In another embodiment, the fluorine-containing solvent is selected from ethyl nonafluorobutyl ether ($C_4F_9OC_2H_5$), methyl nonafluorobutyl ether ($C_4F_9OCH_3$), tetrafluoropropanol, octafluoropentanol, trifluoroacetic acid, pentafluorobutane (HFC-365mfc), decafluoropentane (HFC-4310), or combinations thereof.

The non-fluorine-containing solvent may be selected from an alkane, alkene, arene, halogenated-hydrocarbon, ether, ester, ketone, alcohol, carboxylic acid, or a combination thereof. Exemplary non-fluorine-containing solvents include ethanol, isopropanol, methanol, acetone, tetrahydrofuran, propylene glycol monomethyl ether, propylene glycol methyl ether acetate, dipropylene glycol monomethyl ether, and combinations thereof.

The organic solvent may be selected from group consisting of isopropyl alcohol, ethanol, 1,1,1,3,3-pentafluorobutane, tetrafluoro-1-propanol, ethoxynonafluorobutane, and combinations thereof.

In one embodiment, the composition comprises as little as 50 wt. %, 70 wt. %, 75 wt. %, as great as 90 wt. %, 99.9 wt. %, 99.99 wt. % of the organic solvent, or within any range defined between any two of the foregoing values, based on the total weight of the composition, 4. Optional Additives In some embodiments, the composition may include one or more optional additives. Exemplary optional additives include water, crosslinkers, catalysts, nanosize particles, surfactants, and lubricants.

a. Water

The composition may include water. In one embodiment, if water is present, the composition comprises as little as 0.01 wt. %, 0.1 wt. %, 0.5 wt. %, as great as 1 wt. %, 5 wt. %, 10 wt. %, 20 wt. % of water, or within any range defined between any two of the foregoing values, based on the total weight of the composition.

b. Crosslinkers

The composition may include at least one crossinker. Exemplary crosslinkers include polyphosphazene, glycoluril, melamine, benzoguanamine, urea, and combinations thereof. In one embodiment, if the crosslinker is present, the composition comprises as little as 0.01 wt. %, 0.1 wt. %, 0.5 wt. %, as great as 0.5 wt. %, 5 wt. %, 10 wt. % of the crosslinker, or within any range defined between any two of the foregoing values, based on the total weight of the composition.

c. Catalysts

The composition may include at least one catalyst. Exemplary catalysts include acid, alkaline, metal-organic, and tetraalkylammnonium salt catalysts. In one embodiment, if a catalyst is present, the composition comprises as little as 0.1 wt. %, 0.5 wt. %, 1 wt. %, as great as 5 wt. %, 10 wt. % of the catalyst, or within any range defined between any two of the foregoing values, based on the total weight of the composition.

Exemplary acid catalysts include inorganic acids and organic acids. Exemplary inorganic acids include hydrochloric acid, nitric acid, and sulfuric acid. In another more particular embodiment, the acid catalyst includes at least one organic acid. Exemplary organic acids include acetic acid and trifluoroacetic acid. The acid catalyst may include a thermal acid generator and a photoacid generator. Exemplary thermal acid generators include amine blocked dodecybenzenesulfonic acid (DDBSA), o-nitrobenzyl tosylate, and combinations thereof. Exemplary photoacid generators include (trifluoro-rnethylsulfonyloxy)-bicyclo[2.2.1]hept-5-ene-2,3-dicarboximide (MDT), N-hydroxy-naphthalimide (DDSN) onium salts, aromatic diazonium salts, sulfonium salts, diaryliodonium salts, sulfonic acid esters of N-hydroxyamides, imides, and combinations thereof.

Exemplary alkaline or basic catalysts include inorganic alkalines and organic alkalines. Exemplary inorganic alkalines include sodium hydroxide, potassium hydroxide, ammonium hydroxide, and mixtures thereof. Exemplary organic alkalines include tetraalkylammonium hydroxides such as tetramethylammonium hydroxide, tetrabutylammonium hydroxide, and mixtures thereof. The alkaline catalyst may include a thermal base generator and a photo base generator. Exemplary thermal base generators include o-[(β-(dimethylamino)ethyl)aminocarbonyl]benzoic acid o-[(γ-(dimethylamino)propyl)aminocarbonyl]benzoic acid, 2,5-bis[(β-(dimethylarnino)ethyl)aminocarbonyl]terephthalic acid, 2,5-bis[(γ-(dimethylamino)propyl)aminocarbonyl]terephthalic acid, 2,4-bis[(β-(dimethylamino)ethyl)aminocarbonyl]isophthalic acid, 2,4-bis[(γ-(dimethylamino)propyl)aminocarbonyl]isophthalic acid, and combinations thereof Exemplary photo base generators include benzophenone oxime hexamethylene diurethane, 2-(9-Oxoxanthen-2-yl) propionic acid 1,5,7-triazabicyclo[4.4.0]dec-5-ene salt, and combinations thereof.

Exemplary metal-organic catalysts include tin organics such as dibutyltindilaurate, zinc organics such as zinc dioctanoate, aluminum organics such as aluminum acetylacetonate, titanium organics such as titanium diisopropoxide bis-2,4-pentanedionate (TIACA) and combinations thereof.

Exemplary tetralkylammonium salt catalysts include tetramethylammonium acetate, tetramethylammonium nitrade, and mixtures thereof.

d. Nanosize Particles

The composition may include at least one type of nanosize particles. Exemplary nanosize particles organic nanoparticles, such as polyethylene (PE), polychlorotrifluoroethylene (PCTFE), and polytetrafluoroethylene (PTFE), and inorganic nanoparticles such silica, alumina, titania, zirconia, silicon nitride, boron nitride, other metal oxides, and other metal nitrides. In a more particular embodiment, the nanosize particles include organic particles, inorganic particles, or combinations thereof. In more particular embodiments, the nanosize particles have a diameter less than 10 microns, less than 1 micron, or less than 0.1 micron, In one embodiment, the nanosize particles have a diameter as little as 0.01 micron, 0.1 micron, 0.5 micron, as great as 1 micron, 5 microns, 10 microns, or within any range defined between any two of the foregoing values. In one embodiment, if the composition includes nanosize particles, the composition comprises as little as 0.1 wt. %, 1 wt. %, 5 wt. %, as great as 10 wt. %, 15 wt. %, 20 wt., of the nanosize particles, or within any range defined between any two of the foregoing values, based on the total weight of the composition.

The nanosize particles may be colloidal silica. Colloidal silica includes particles having a diameter as small as 7 nm, 10 nm, 15 nm, 20 nm, 25 nm, as great as 40 nm, 50 nm, 60 nm, 70 nm, 80 nm 100 nm, or within any range defined between any pair of the foregoing values. Colloidal silica may have an alkali or acid pH, and may have a positive or negative charge. Exemplary colloidal silica are the SNOWTEX type silicas available from Nissan Chemical Industries, Ltd. In one embodiment, the colloidal silica reacts with and bonds to the polymer, the fluorine-containing moieties, or both.

e. Surfactants

The composition may include at least one surfactant. Exemplary surfactants include BYK® 306, 307, 345, 347 available from BYK Chemie, TEGO® 300 available from Evonik, and 3M™ Novec™ Fluorosurfactant FC 4430 available from 3M. In one embodiment, if the composition includes a surfacant, the composition comprises as little as 0.01 wt. %, 0.05 wt. %, as great as 0.1 wt. %, 0.5 wt. %, 1 wt. % of the surfactant, or within any range defined between any two of the foregoing values, based on the total weight of the composition.

f. Lubricants

The composition may include at least one lubricant. Exemplary lubricants include perfluoropolyether, silicone, and combinations thereof. In one more particular embodiment, the lubricant is a non-endcapped completely saturated perfluoropolyether of the formula (V):

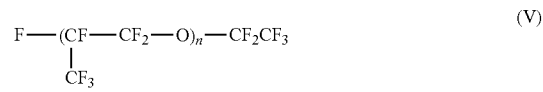

where n is an integer from 10 to 60. Exemplary lubricants include the Krytox GPL oils, available from DuPont and PA100E, available from Solvay.

In one embodiment, if the composition includes a lubricant, the composition comprises as little as 0.01 wt. %, 0.05 wt. %, 0.1 wt. %, 0.5 wt. % as great as 1 wt. %, 5 wt. %, 10 wt. % of the lubricant, or within any range defined between any two of the foregoing values, based on the total weight of the composition.

B. Method of Producing a Composition

In one embodiment, a method of producing a composition including an organic solvent and a polymer according to any of the above embodiments is provided. In an exemplary embodiment, the method includes forming a mixture of at least one organic solvent and at least one siloxane precursor material containing at least one —Si—O—$R^a$ bond, wherein $R^a$ is an alkyl of 1-4 carbons. The mixture may include additives, including but not limited to water, catalysts, crosslinkers, and nanosize particles. The at least one siloxane precursor material is reacted in the presence of a catalyst to form a polymer matrix in the solvent. Exemplary polymerization reactions include condensation reactions. Additional solvent and/or additives, such as catalysts, crosslinkers, nanosize particles, and surfactant, may he added to the reacted mixture.

Exemplary suitable precursor materials include alkoxy-capped perfluropolyethers and perfluorotriethoxysilanes. An exemplary alkoxy-capped perfluoropolyether is triethoxy-endcapped perfluoropolyether, available commercially as Fluorolink S10 from Solvay. An exemplary perfluorotriethoxysilane is 1H,1H,2H,2H-perfluorooctyltriethoxysilane, available commercially as F8261 from Evonik Degussa.

Other exemplary suitable precursor materials include, tetraalkoxy silanes, trialkoxy silanes, dialkoxy silanes, monoalkoxy silanes, and combinations thereof. Tetraalkoxy silanes may include one or more ethoxy, methoxy, and/or propoxy groups as well as hydrogen, methyl, ethyl or propyl groups Exemplary tetraalkoxy silanes include tetrathethyl orthosilcate (TEOS) and tetramethoxysilane, i.e., tetramethyl orthosilcate (TMOS). Exemplary triethoxy silanes include methyltriethoxy silane (MTEOS), aminopropyltriethoxy silane (APTEOS). APTEOS-triflate, vinyltriethoxy silane (VTEOS), diethylphosphatoethyltriethoxy silane and (3-glycidoxypropyl)-trimethoxy silane. Exemplary dialkoxy silanes are methyldiethoxy silane (MDEOS), dimethyldiethoxy silane (DMDEOS), and phenyldiethoxy silane (PDEOS).

The polymer matrix includes a plurality of Si—O—Si linkages and at least two fluorine-containing moieties. Each of the fluorine-containing moieties is independently attached to at least one of the Si—O—Si linkages. Each fluorine-containing moiety independently includes: a linking portion and a fluorinated portion attached to the linking portion.

The catalyst may be an acidic catalyst as described above. Exemplary acid catalysts include hydrochloric acid, nitric acid, sulfuric acid, acetic acid, and trifluoroacetic acid, Acid catalyzed hydrolysis and polycondensation reactions of polysiloxane precursor materials are known.

The catalyst may be an alkaline or basic catalyst as described above. Exemplary alkaline or basic catalysts include sodium hydroxide, potassium hydroxide, ammonium hydroxide, tetramethylammonium hydroxide, and tetrabutylammonium hydroxide. Base catalyzed hydrolysis and polycondensation reactions of polysiloxane precursor materials are known.

The catalyst may be a metal-organic catalyst as described above. Exemplary metal-organic catalysts include tin organics such as dibuyltindilaurate, zinc organics such as zinc dioctanoate, aluminum organics such as aluminum acetylacetonate, titanium organics such as titanium diisopropoxide bis-2,4-pentanedionate (TIACA) and combinations thereof. Metal-organic catalyzed polymerization reactions of polysiloxane precursor materials are known.

The catalyst may be a tetralkylammonium salt catalyst as described above. Exemplary tetralkylammonium salt catalysts include tetramethylammonium acetate, tetrarnethylammonium nitrade, and combinations thereof. Tetralkylammonium salt catalyzed polymerization reactions of polysiloxane precursor materials are known.

In one embodiment, stirring the mixed components is performed at a temperature as low as 0° C., 20° C., 30° C., 50 ° C., as high as 75° C., 80° C., 90° C., 100° C., or within any range defined between any two of the foregoing values. In another more particular embodiment, stirring the mixed components is performed fora duration as little as 0.5 hours, 1 hour, as lona as 50 hours, 200 hours, or within any range defined between any two of the foregoing values.

The mixing and reacting steps together may include stirring the components of the mixture. The components may be stirred for as little as 20 minutes, 30 minutes, 1 hour, 2 hours as much as 8 hours, 12 hours, 24 hours, 48 hours, or within any range defined between any two of the foregoing values. The components may be stirred at a temperature as low as room temperature, 25° C., 30° C., 40° C., or as high as 50° C., 60° C., 75° C., or within any range defined between any two of the foregoing values.

C. Coated Substrate and Method of forming Optically Transparent Coating on the Substrate In one embodiment, a coated element comprising a substrate and an optically transparent coating is provided.

In another embodiment, a method of forming an optically transparent coating on the substrate is provided. The method includes coating a substrate with a composition according to any of the above embodiments including an organic solvent and a polymer, and curing the composition to form an optically transparent coating on the substrate.

Exemplary substrates include glass, ceramic, plastic, textile, paper, metal, and metal oxide substrates. Exemplary ceramic substrates include porcelain, ceramic tile, bowl, bathtub, wash-basin ceramic, and combinations thereof. Exemplary plastic substrates include poly(methyl methacrylate) (PIMA), polyethylene terephthalate (PET), polycarbonate (PC), acrylonitrile butadiene styrene (ABS), and combinations thereof. Exemplary metal oxides include silicon oxide, magnesium oxide, aluminum oxide, titanium oxide, zirconium oxide, sodium oxide, indium oxide, zinc oxide, and indium tin oxide (ITO), and combinations thereof.

The substrate may be optically transparent. The substrate may itself include at least one underlying and/or previously applied coating to which the polysiloxane coating is applied. Exemplary pre-applied or underlying coatings include anti-reflection coatings, anti-glare coatings, and anti-scratch coatings.

The method forming an optically transparent coating may further include at least one pretreatment step, Exemplary pretreatment steps include surface treating the substrate, cleaning the substrate, and primer coating the substrate. Exemplary surface treating methods include plasma treatment of the substrate, mechanical texturing of the substrate, and combinations thereof. Exemplary cleaning methods include water cleaning, acid cleaning, alkaline cleaning, or combinations thereof. Exemplary acid cleaning methods include cleaning with hydrofluoric acid, nitric acid, acetic acid, or combinations thereof. Exemplary alkaline cleaning methods include cleaning with an inorganic alkaline such as sodium hydroxide, potassium hydroxide, or ammonia, an organic alkaline such as tetramethylammonium hydroxide or an amine of the formula $NR_3$ wherein R is hydrogen or an alkyl group, or combinations thereof. Exemplary cleaning methods include at least one cleaning step selected from rinsing the substrate, dipping the substrate, brushing the substrate, ultrasonically cleaning the substrate, or combinations thereof. Exemplary primer coating methods include sol-gel coating, evaporative coating, and combinations thereof. Exemplary sol-gel coatings include oxides of silica, aluminum, zirconium, titanium, tin, and combinations thereof. Exemplary evaporative coatings include tetraethoxylsilane (TEOS), hexmethyldisilazane (HMDS), and combinations thereof.

Coating the substrate may involve at least one wet or dry coating method. Exemplary wet coating methods include spray, spin, roller, dip, slit, curtain, and brush methods, or combinations thereof. Exemplary dry coating methods include chemical vapor deposition (CVD), physical vapor deposition (PVD), or combinations thereof. Exemplary CVD methods include plasma-enhanced CVD (PECVD), optical CVD, and heat CVD. Exemplary PVD methods include vacuum evaporation, reactive evaporation, ion-beam assisted evaporation, sputtering, ion plating, more preferably vacuum evaporation and sputtering. Illustratively, a PVD method may include forming a vapor by sublimation or vaporization of one or more organic components, followed by condensing the vapor into a thin film onto a substrate. In one embodiment, the PVD method includes preparing a capsule matrix comprising the steps of: dipping a capsule matrix into a solution, and drying the wetted capsule matrix to obtain a target. An exemplary capsule matrix is metal wool. The target may then be used as a source of vapor when performing PVD in a PVD chamber. In one embodiment, the substrate is coated with a primer prior to the coating being applied by PVD. Exemplary primers include silicon oxide. Exemplary PVD chamber conditions include a temperature of about 80° C. and a pressure of about $10^{-3}$ Pa.

In a more particular embodiment, the PVD method includes preparing a capsule matrix including the coating, applying a primer to the substrate, placing the capsule matrix and substrate in a PVD chamber, performing the PVD in the PVD chamber to vaporize or evaporate the coating from the capsule matrix and condense the resulting vapor on the substrate to form the coating.

Curing the composition may include at least one thermal treatment or oven heating method. Exemplary thermal treatments include hotplate heating, electric heating, infrared (IR) heating, heating gas glowing. The curing may be performed under air condition, active gas condition, or a combination thereof. Exemplary active gasses include ammonia and amines of the formula $NR_3$, wherein R is an alkyl group. Curing the composition may also include at least one process selected from humidification, catalytic post treatment, photoirradiation, electron beam irradiation, and combinations thereof.

Curing the composition may be at least partially performed at a temperature as low as 25° C., 50° C., 75° C., 100° C., as high as 150° C., 175° C., 200° C., 250° C., 300° C., or within any range defined between any two of the foregoing values. The duration of the curing step may be as long as 30 minutes, 25 minutes, 20 minutes, as short as 15 minutes, 10 minutes, 5 minutes, or within any range defined between any two of the foregoing values.

D. Illustrative Properties of Poly Fluorine-containing Siloxane Coatings

A coating formed from any of the above embodiments may have a water contact angle as little as 80 degrees, 90 degrees, 95 degrees, 100 degrees, as great as 105 degrees, 108 degrees, 110 degrees or higher, or within any range defined between any two of the foregoing values.

A coating formed from any of the above embodiments may have an oleic acid contact angle as little as 50 degrees, 60 degrees, 65 degrees, 70 degrees, 75 degrees as great as 80 degrees, 85 degrees, 90 degrees, 95 degrees , or higher, or within any range defined between any two of the foregoing values.

A coating formed from any of the above embodiments may provide increased scratch resistance, as measured by the difference in water or oleic acid contact angle before and after a scratch test, The water contact angle loss following the scratch test may be as little as 0 degrees, 5 degrees, 10 degrees, as great as 20 degrees, 30 degrees, 40 degrees, or higher, or within any range defined between any two of the foregoing values.

A coating formed from any of the above embodiments may provide a smooth coating surface, as reflected by the dynamic friction coefficient. The dynamic friction coefficient may bas as little as 0.03, 0.05, 0.1, as great as 0.2, 0.5, 0.7, or within any range defined between any two of the foregoing values.

A coating formed from any of the above embodiments may have a final coating thickness as little as 1 nm, 5 nm, 10 nm, 50 nm, 100 nm, as great as 500 nm, 1 micron, 5 micron, 10 micron, or within any range defined between any two of the foregoing values.

A coating formed from any of the above embodiments may be used to coat a substrate that forms a portion of a display, a touch panel, goggles, a mirror, a building window, an automobile, a water heater, an electronic control panel, a greenhouse, or a photovoltaic component.

E. Another Embodiment of a Coating Solution

In another embodiment, a coating solution is provided. The coating solution includes at least one alcohol of 1-4 carbons; and at least one perfluoro-ether containing polymer of the formula: $[R^a—O]_3—Si—[CH_2]_a—O—W_1—O—[CH_2]_b—Si—[O—R^a]_3$, wherein $R^a$ is an alkyl of 1-4 carbons; a is from 2 to 10; b is from 2 to 10; and $W_1$ includes at least one $—CF_2—O—CF_2$ linkage. The polymer of the formula $[R^a—O]_3—Si—[CH_2]_a—O—W_1—O—[CH_2]_0—Si—[O—R^a]_3$, may be formed from an alkoxy-endcapped perfluropolyether. Exemplary alcohols of 1-4 carbons include isopropyl alcohol, ethanol, and mixtures thereof.

The coating solution may further comprise a fluorinated alkane of 3-10 carbons. An exemplary fluorinate alkane is 1,1,1 ,3,3,-penafluorobutane, available commercially as F8261 from Evonik Degussa.

A coating formed from any of the above embodiments may have a water contact angle as little as 90 degrees, 95 degrees, 96 degrees as high as 97 degrees, 101 degrees, 105 degrees or higher, or within any range defined between any two of the foregoing values.

A coating formed from any of the above embodiments may have an oleic acid contact angle as little as 60 degrees, 65 degrees, 70 degrees, 75 degrees, as great as 80 degrees, 85 degrees, 90 degrees or higher, or within any range defined between any two of the foregoing values.

A coating formed from any of the above embodiments may provide increased scratch resistance, as measured by the difference in water or oleic acid contact angle before and after a scratch test. The water contact angle loss following the scratch test may be as little as 0 degrees, 5 degrees, 10 degrees, as great as 20 degrees, 30 degrees, 40 degrees, or higher, or within any range defined between any two of the foregoing values.

A coating formed from any of the above embodiments may provide a smooth coating surface, as reflected by the dynamic friction coefficient. The dynamic friction coefficient may bas as little as 0.03, 0.05, 0.1, as great as 0.2, 0.5, 0.7, or within any range defined between any two of the foregoing values.

A coating formed from any of the above embodiments may have a final coating thickness as little as 1nm, 5 nm, 10 nm, 50 nm, 100 nm, as great as 500 nm, lmicron, 5 micron, 10 micron, or within any range defined between any two of the foregoing values.

A coating formed from any of the above embodiments may be used to coat a substrate that forms a portion of a display, a touch panel, goggles, a mirror, a building window, an automobile, a water heater, an electronic control panel, a greenhouse, or a photovoltaic component.

EXAMPLES

A. Polymerized 1H, 1H, 2H, 2H-perfluorooctyltriethoxysilane

1. Acid Catalyzed Polymerization of 1H, 1H, 2H, 2H-perfluorooctyltriethoxysilane Ethanol, deionized water, and 1H, 1H, 2H, 2H-perfluorooctyltriethoxysilane (commercially available as F8261 from Evonik Degussa) were added to a 250 mL flask in the amounts shown in Table 1. The mixture was magnetically stirred for 10 minutes, and acetic acid was added dropwise with a burette, resulting in an acid-catalyzed hydrolysis reaction of the ethoxysilane moieties of the 1H,1H,2H,2H-

Perfluorooctyltriethoxysilane. The mixture was stirred for an additional 120 minutes. The rotating speed of the magnetic stirrer was then set to 300 rpm and the solution was stirred for 6 hours. For example 5, the solution was heated to 74° C. during the six hours of stirring; the heating was then stopped and magnetic stirring continued overnight.

For examples 3 and 5, the resulting solution was then diluted with ethanol, as indicated in Table 1, and the solution was stirred as indicated.

TABLE 1

Formulation of Examples 1, 3, and 5

|  | Ex. 1 | Ex. 3 | Ex. 5 |
| --- | --- | --- | --- |
| Ethanol (g) | 91 | 50 | 50 |
| Deionized water (g) | 2 | 4 | 4 |
| F8261 (g) | 2 | 4 | 4 |
| Acetic Acid (g) | 5 | 10 | 10 |
| Dilute sol (g):ethanol (g) | — | 33:66 | 34:66 |
| Stir Time (hours) | — | 24 | 0.5 |

Each of solutions 1, 3, and 5 was diluted with 1,1,1,3,3-pentafluorobutane (commercially available as 365 mfc from Solvay, boiling point about 40° C.) as indicated in Table 2. The mixture was magnetically stirred for half an hour. For example 21, the solution was stirred 3 hours at 25° C. to obtain a transparent liquid.

TABLE 2

Formulation of Examples 2, 21, 4, and 6-8

|  | Ex. 2 | Ex. 21 | Ex. 4 | Ex. 6 | Ex. 7 | Ex. 8 |
| --- | --- | --- | --- | --- | --- | --- |
| Starting Solution | Ex. 1 | Ex. 1 | Ex. 3 | Ex. 5 | Ex. 5 | Ex. 5 |
| Amount of Solution (g) | 33 | 17 | 33 | 50 | 33 | 25 |
| 365 mfc (g) | 68 | 34 | 86 | 50 | 66 | 75 |

For each of examples 1-8 and 21, the hydrophobicity of the sample was measured. A 70 mm by 70 mm piece of flat display glass 0.7 mm in thickness was pre-cleaned by immersion in isopropanol and placement in an ultrasonic cleaning machine for 5 minutes.

A 1.5 mL. sample of each example 1-8 and 21 was spin coated on one of the display glass pieces using a spin speed of 500 rpm for 20 seconds. Each sample was cured by hot plate as indicated in Table 3 to obtain a hydrophobic film. The water contact angle for each coating, and the oleic acid contact angle for Example 21, was determined using a Surface Electro Optics Phoenix 300 contact angle analyzer. The contact angle for each sample is provided in Table 3.

TABLE 3

Baking Conditions and Resulting Contact Angle

| Example | Cure Temp. (° C.) | Cure Time (min) | Water Contact Angle (°) | Oleic Acid Contact Angle (°) |
| --- | --- | --- | --- | --- |
| Example 1 | 150 | 10 | 97 | — |
| Example 2 | 150 | 10 | 108 | — |
| Example 2 | 200 | 10 | 110 | — |
| Example 2 | 250 | 10 | 113 | — |
| Example 2 | 250 | 30 | 114 | — |
| Example 3 | 150 | 10 | 98 | — |
| Example 4 | 150 | 10 | 110 | — |
| Example 4 | 200 | 10 | 114 | — |
| Example 4 | 250 | 10 | 116 | — |
| Example 4 | 250 | 30 | 117 | — |

TABLE 3-continued

Baking Conditions and Resulting Contact Angle

| Example | Cure Temp. (° C.) | Cure Time (min) | Water Contact Angle (°) | Oleic Acid Contact Angle (°) |
| --- | --- | --- | --- | --- |
| Example 5 | 250 | 30 | 108 | — |
| Example 6 | 150 | 10 | 113 | — |
| Example 7 | 150 | 10 | 125 | — |
| Example 7 | 250 | 10 | 126 | — |
| Example 7 | 250 | 30 | 121 | — |
| Example 8 | 150 | 10 | 113 | — |
| Example 8 | 250 | 10 | 125 | — |
| Example 21 | 200 | 5 | 103 | 67 |

To confirm that polymerization had taken place, FTIR spectra for F8261 and Example 7 were obtained. A comparison of the spectra is shown in FIG. 1. As shown in FIG. 1, the spectrum from Example 7 includes a peak at 1052.4 cm$^{-1}$, which is not present in the spectrum from F8261. This peak is typical for —Si—O—Si— structure. The formation of the peak indicated that condensation of siloxane, and thus polymerization of the 1H, 1H, 2H, 2H-perfluorooctyltriethoxysilane, took place during the synthesis.

2. Alkaline-Catalyzed Polymerization of 1H, IH, 2H, 2H-penfluorooctyltriethoxysilane For Example 19, dipropylene glycol monomethyl ether (DPM) was dissolved in 1H,1H,2H,2H-perfluorooctyltriethoxysilane (F8261 from Evonik Degussa) in the amounts shown in Table 4. Sodium hydroxide was added as a catalyst. The solution was shaken until it was homogeneous and transparent. The solution was healed to 60° C. with stirring for 7 hours to perform abase-Catalyzed hydrolysis reaction. The final product was translucent and slightly white in color.

TABLE 4

Formulation of Example 19

|  | Ex. 19 |
| --- | --- |
| F8261 (g) | 0.525 |
| DPM (g) | 52.5 |
| 0.5% mass fraction NaOH water solution | 1.234 |

A 1.5 mL sample of example 19 was spin coated on 70 mm by 70 mm display glass piece as previously indicated. In addition, a 1.5 mL sample of example 19 was spin coated on 70 mm by 70 mm anti-reflective (AR) coated solar glass (textured) piece. The AR coated solar glass sample was flushed by water and blown to dry first prior to applying example 19. The samples were cured by hot plate for 5 minutes at 200° C. to obtain a hydrophobic film. The water contact angle and oleic acid contact angle as measured by the contact angle analyzer for Example 19 are provided in Table 5.

TABLE 5

Contact Angle Results

| Example | Water Contact Angle (°) | Oleic Acid Contact Angle (°) |
| --- | --- | --- |
| Example 19 - glass | 99 | 67 |
| Example 19 - AR glass | 90 | — |

For Examples 22 and 23, 1H,1H,2H,2H-perfluorooctyl-triethoxysilane (F8261 from Evonik Degussa) was added to either methyl ethyl ketone (MEK) or ethanol in the amounts shown in Table 6. A sodium hydroxide solution, either 0.5% or 3% mass fraction, was added as a catalyst. The Example 22 solution was shaken the solution until homogeneous and transparent, followed by stirred at 50° C. for 3 hours to perform a base-catalyzed hydrolysis. The Example 23 was stirred at 25° C. for 3 hours to perform a base-catalyzed hydrolysis, followed by dilution in 1.1.1.3.3-pentafluorobutane (365 mfc from Solvay).

TABLE 6

Formulation of Examples 22 and 23

|  | Ex. 22 | Ex. 23 |
| --- | --- | --- |
| F8261 (g) | 0.6 | 0.5 |
| Methyl Ethyl Ketone (g) | 59.4 | — |
| Ethanol (g) | — | 9.5 |
| 0.5% NaOH (g) | 1.4 | — |
| 3% NaOH (g) | — | 0.5 |
| 365 mfc (g) | — | 40 |

A 1.5 mL sample of each example 22 and 23 was spin coated on 70 mm by 70 mm display glass piece as previously indicated. The samples were cured by hot plate for 5 minutes at 200° C. to obtain a hydrophobic film. The water contact angle and oleic acid contact angle as measured by the contact angle analyzer for Examples 22 and 23 are provided in Table 7.

TABLE 7

Contact Angle Results

| Example | Water Contact Angle (°) | Oleic Acid Contact Angle (°) |
| --- | --- | --- |
| Example 22 | 105 | 63 |
| Example 23 | 100 | 62 |

2. DBTDL Catalyzed Polymerization of 1H, 1H, 2H, 2H-perfluorooctyltriethoxysilane 1H, 1H, 2H, 2H-Perfluorooctyltriethoxysilane (F8261 from Evonik Degussa) and dimethyldiethoxysilane (DM-DEOS) in the amounts shown in Table 8 were combined with the solvents 1,1,1,3,3-pentafluorobutane (365 mfc from Solvay) and ethanol. Water was added for hydrolyzation and dibutyltindilaurate (DBTDL) was added as a salt catalyst. The mixture was stirred at 25° C. for 17 hours to perform a salt-catalyzed polymerization. A transparent and colorless liquid was produced.

TABLE 8

Formulation of Example 29

|  | Ex. 29 |
| --- | --- |
| F8261 (g) | 0.5 |
| DMDEOS (g) | 0.025-0.15 |
| Ethanol (g) | 6.5 |
| 365 mfc (g) | 16 |
| DBTDL (g) | 0.5 |
| Water (g) | 1 |

A 1.5 mL sample of example 29 was spin coated on a 70 mm by 70 mm display glass piece as previously indicated. The sample was cured by hot plate for 5 minutes at 200° C. to obtain a hydrophobic film. The water contact angle as measured by the contact angle analyzer for Example 29 is provided in Table 9.

The dynamic friction coefficient for Example 29 was measured using a GM-1 Coefficient of Friction Tester from Guangzhou Biaoji Packaging Equipment Co., Ltd. The friction material was Double A paper. The dynamic friction coefficient is provided in Table 9.

TABLE 9

Dynamic friction coefficient

| Example | Water Contact Angle (°) | Dynamic Friction Coefficient |
| --- | --- | --- |
| Example 29 | 96 | 0.57 |

B. —Si(OCH$_2$CH$_3$)$_3$ Endcapped Perfluoropolyether

1. Solvent Stabilized —Si(OCH$_2$CH$_3$)$_3$ Endcapped Perfluoropolyether

For Examples 10, 14, and 20, —Si(OCH$_2$CH$_3$)$_3$ endcapped perfluoropolyether having a molecular weight of between about 1750 and 1950 (commercially available as Fluorolink S10 from Solvay) was added to a solvent or mixture of solvents in the amounts indicated in Table 12. For Example 10, the resulting mixture was stirred overnight to react the S10 with the solvent. For Example 14, the mixture was magnetically stirred for four hours to react the S10 with the solvents. For Example 20, the mixture was stirred at 25° C. for 3 hours to react the S10 with the solvent and allowed to stand for 48 hours. The final solution in Example 20 was transparent and colorless.

TABLE 10

Formulation of Examples 10, 14, and 20

|  | Ex. 10 | Ex. 14 | Ex. 20 |
| --- | --- | --- | --- |
| Fluorolink S10 (g) | 0.2 | 0.67 | 1 |
| Isopropyl Alcohol (g) | 99.8 | — | — |
| Ethanol (g) | — | 31.27 | — |
| 365 mfc (g) | — | 68.73 | — |
| Isopropyl Alcohol or Ethanol (g) | — | — | 99 |

A 1.5 mL sample of each of examples 10, 14, and 20 was spin coated on a 70 mm by 70 mm display glass piece as previously indicated. In addition, a 1.5 mL sample of example 20 was spin coated on 70 mm by 70 mm anti-reflective (AR) coated solar glass (textured) piece. The AR coated solar glass sample was flushed by water and blown to dry first prior to applying example 19. The samples were cured by hot plate to obtain a hydrophobic film. The samples for Examples 10 and 14 were cured for 10 minutes at 150° C. The sample for Example 20 was cured for 5 minutes at 200° C. The water contact angle and oleic acid contact angle as measured by the contact angle analyzer for Examples 10, 14, and 20 are provided in Table 11.

TABLE 11

Contact Angle

| Example | Water Contact Angle (°) | Oleic Acid Contact Angle (°) |
| --- | --- | --- |
| Example 10 | 101 | — |
| Example 14 | 96 | — |

TABLE 11-continued

Contact Angle

| Example | Water Contact Angle (°) | Oleic Acid Contact Angle (°) |
|---|---|---|
| Example 20 - glass | 97 | 63 |
| Example 20 - AR glass | 90 | — |

2. Acid Catalyzed polymerization of —Si(OCH$_2$CH$_3$)$_3$ Endcapped Perfluoropolyether For Examples 11 and 12, —Si(OCH$_2$CH$_3$)$_3$ endcapped perfluoropolyether and deionized water were added to a mixture of ethanol and either 1,1,1,3,3-pentafluorobutane (365 mfc, available from Solvay) or ethoxynonafluorobutane (commercially available as Novec 7200, from 3M, boiling point about 70-72° C.) in the amounts indicated in Table 12. The mixtures were each magnetically stirred for 10 minutes, followed by dropwise addition of acetic acid by a burette and another 20 minutes of stirring. The magnetic stirring speed was then set to 300 rpm. Example 11 was stirred for 20 hours to produce an acid catalyzed hydrolysis polymerization reaction. Example 12 was heated to 74° C. and stirred for 6 hours to produce an acid catalyzed hydrolysis polymerization reaction.

For Example 24, —Si(OCH$_2$CH$_3$)$_3$ endcapped perfluoropolyether (Fluorolink S10 from Solvay) was added to a mixed solvent of ethanol and 1,1,1,3,3-pentafluorobutane (365 mfc from Solvay) in the amounts indicated in Table 12. Nitric acid (3.5% mass fraction) was added as a catalyst, and the solution was stirred at 25° C. for 1 hour to produce an acid catalyzed hydrolysis polymerization reaction. A transparent liquid was produced.

For Example 25, —Si(OCH$_2$CH$_3$)$_3$ endcapped perfluoropolyether (Fluorolink S10 from Solvay) was dissolved in ethanol in the amounts indicated in Table 12. Nitric acid (3.5% mass fraction) was added as a catalyst. The mixed solution was shaken until homogeneous. A silanol-terminated polydimethylsiloxane having a molecular weight of 400-700 (commercially available as DMS-S12 from GELEST) was diluted to 10% mass fraction in ethanol. The 10% S12 solution was added dropwise to the S10 solution (10 seconds between drops) to produce an acid catalyzed hydrolysis polymerization reaction. After ten minutes of stirring, a transparent and colorless final liquid was produced.

TABLE 12

Formulation of Examples 11, 12, 24, and 25

| | Ex. 11 | Ex. 12 | Ex. 24 | Ex. 25 |
|---|---|---|---|---|
| Fluorolink S10 (g) | 2 | 2 | 0.5 | 0.2 |
| Ethanol (g) | 11 | 30.2 | 16 | 49 |
| 365 mfc (g) | 80 | — | 33 | — |
| 3M Novec 7200 (g) | — | 60.8 | — | — |
| Deionized water (g) | 2 | 2 | — | — |
| Acetic add (g) | 5 | 5 | — | — |
| 3.5% nitric acid (g) | — | — | 0.5 | 2 |
| 10% DMS-S12 in ethanol (g) | — | — | — | 1 |

A 1.5 mL sample of each of examples 11 and 12 was spin coated on a 70 mm by 70 mm display glass piece as previously indicated. The sample was cured by hot plate to obtain a hydrophobic film. The samples for examples 11 and 12 were cured for 10 minutes at 150° C. The samples for examples 24 and 25 were cured for 5 minutes at 200° C. The water contact angle and oleic acid contact angle as measured by the contact angle analyzer for Examples 11, 12, 24, and 25 is provided in Table 13.

TABLE 13

Contact Angle

| Example | Water Contact Angle (°) | Oleic Acid Contact Angle (°) |
|---|---|---|
| Example 11 | 96 | — |
| Example 12 | 93 | — |
| Example 24 | 102 | 71 |
| Example 25 | 103 | — |

The dynamic friction coefficient for Example 25 was measured using a GM-1 Coefficient of Friction Tester from Guangzhou Biaoji Packaging Equipment Co., Ltd. The friction material was Double A paper. The dynamic friction coefficient is provided in Table 14. The inclusion of the S12 provided excellent dynamic friction results.

TABLE 14

Dynamic Friction Coefficient

| Example | Water Contact Angle (°) | Dynamic Friction Coefficient |
|---|---|---|
| Example 25 | 103 | 0.22 |

3. DBTDL-Salt Catalyzed polymerization of —Si(OCH$_2$CH$_3$)$_3$ Endcapped Perfluoropolyether For Example 26, —Si(OCH$_2$CH$_3$)$_3$ endcapped perfluoropolyether (Fluorolink S10 from Solvay) was mixed with 1,1,1,3,3-pentafluorobutane (365 mfc from Solvay) in the amounts indicated in Table 15. The mixture was stirred by magnetic stirrer. Dibutyltindilaurate (DBTDL) catalyst was diluted with ethanol to 10% mass fraction. The 10% mass fraction DBTDL mixture was added dropwise to the 310 solution (10 seconds between drops) to produce a salt-catalyzed hydrolysis polymerization reaction. After 1 hour of stirring, a transparent and colorless final liquid was produced. The liquid was diluted with 1,1,1,3,3-pentafluorobuiane.

For Example 27, —Si(OCH$_2$CH$_3$)$_3$ endcapped perfluoropolyether (Fluorolink S10 from Solvay) was mixed with 1,1,1,3,3-pentafluorobutane (365 mfc from Solvay) in the amounts indicated in Table 15. The mixture was stirred by magnetic stirrer. Dibutyltindilaurate (DBTDL) catalyst was diluted with ethanol to 1% mass fraction. The 1% mass fraction DBTDL was added dropwise to the S10 solution. Dimethyldiethoxysilane (DMDEOS) was diluted with ethanol to 10% mass fraction. The 10% mass fraction DMDEOS and water were added to the S10 and DBTDL mixture to produce a salt-catalyzed hydrolysis polymerization reaction. After 24 hours of stirring, a transparent and colorless final liquid was produced. The liquid was diluted with 1,1,1,3,3-pentafluorobutane.

For Example 28, —Si(OCH$_2$CH$_3$)$_3$ endcapped perfluoropolyether (Fluorolink S10 from Solvay) was mixed with 1,1,1,3,3-Pentafluorobutane (365 mfc from Solvay) in the amounts indicated in Table 15. The mixture was stirred by magnetic stirrer. Dibutyltindilaurate (DBTDL) catalyst was diluted with ethanol to mass fraction. The 1% mass fraction DBTDL was added dropwise to the S10 solution. Dimethyldiethoxysilane (DMDEOS) was diluted with ethanol to 10% mass fraction and water was added. The 10% DMDEOS solution was stirred for 4 hours at 70° C. to hydrolyze the DMDEOS. The hydrolyzed 10% DMDEOS solution was added to the S10 to produce a salt-catalyzed polymerization reaction. After 24 hours of stirring at 25° C., a transparent and colorless solution was produced. The solution was diluted with 1,1,1,3,3-pentafluorobutane.

TABLE 15

Formulation of Examples 26-28

| | Ex. 26 | Ex. 27 | Ex. 28 |
|---|---|---|---|
| Fluorolink S10 (g) | 2 | 2 | 2 |
| 365 mfc (g) | 47 | 45 | 45 |
| 1% DBTDL in ethanol (g) | — | 2 | 2 |
| 10% DMS-S12 in ethanol (g) | 1 | — | — |
| 10% DBTDL in ethanol (g) | 0.1 | — | — |
| 10% DMDEOS in ethanol (g) | — | 1 | — |
| 10% DMDEOS in ethanol + water (g) | — | — | 1 |
| Water (g) | — | 0.1 | — |
| Dilution 365 mfc (g) | 19 | 19 | 19 |

A 1.5 mL sample of each of examples 11 and 12 was spin coated on a 70 mm by 70 mm display glass piece as previously indicated. The sample was cured by hot plate for 5 minutes at 200° C. to obtain a hydrophobic film. The water contact angle as measured by the contact angle analyzer for Examples 26-28 is provided in Table 16.

The dynamic friction coefficient for Examples 26-28 was measured using a GM-1 Coefficient of Friction Tester from Guangzhou Biaoji Packaging Equipment Co., Ltd. The friction material was Double A paper. The dynamic friction coefficient is provided in Table 16.

TABLE 16

Dynamic friction coefficient

| Example | Water Contact Angle (°) | Dynamic Friction Coefficient |
|---|---|---|
| Example 26 | 90 | 0.24 |
| Example 27 | 92 | 0.11 |
| Example 28 | 92 | 0.11 |

4. Polymerization of —Si(OCH$_2$CH$_3$)$_3$ Endcapped Perfluoropolyethe with Colloidal Silica For Examples 30-32, —Si(OCH$_2$CH$_3$)$_3$ endcapped perfluoropolyether (S10) was dissolved in a solvent in the amounts indicated in Table 17. Colloidal silica having low pH and 20-25 nm spherical particles (commercially available as SNOWTEX-0-40 from Nissan Chemical) was added to the mixture. The solution was stirred at 25° C. for 3 hours, followed by the dilution with of the mixture. After a further 3 hours of stirring at 25° C., a reaction between the colloidal silica and a polymerization of the perfluoropolyether had occurred. A translucent liquid with a little white color was produced.

For Example 33, —Si(OCH$_2$CH$_3$)$_3$ endcapped perfluoropolyether (S10) was dissolved in ethanol in the amounts indicated in Table 17. A colloidal silica selected from a colloidal silica having an alkaline pH and 10-15nm spherical particles (commercially available as SNOWTEX-N-40 from Nissan Chemical), a colloidal silica having a low pH and 50-80 nm spherical particles (commercially available as SNOWTEX-OYL from Nissan Chemical), and a colloidal silica having a low pH and 40-50 nm spherical particles (commercially available as SNOWTEX-OL from Nissan Chemical) was added to the solution. After 5 hours of stirring at 25° C., a reaction between the colloidal silica and a polymerization of the perfluoropolyether had occurred. A translucent liquid with a white color was produced.

TABLE 17

Formulation of Examples 30-33

| | Ex. 30 | Ex. 31 | Ex. 32 | Ex. 33 |
|---|---|---|---|---|
| S10 (g) | 0.3 | 0.3 | 0.3 | 0.3 |
| Ethanol (g) | 29.4 | — | — | 29.4 |
| Isopropanol (g) | — | 29.4 | — | — |
| Tetrafluoro-1-propanol (g) | — | — | 29.4 | — |
| SNOWTEX-0-40 (g) | 0.3 | 0.3 | 0.3 | — |
| Colloidal silica (g) | — | — | — | 0.3 |
| Ethanol (g) | 120 | — | — | — |
| Isopropanol (g) | — | 120 | — | — |
| Tetrafluoro-1-propanol (g) | — | — | 120 | — |

A 1.5 mL sample of each example 30-33 was spin coated on a 70 mm by 70 mm display glass piece as previously indicated, except that the glass pieces were immersed in 3% (mass fraction) sodium hydroxide rather than water. The samples were cured by hot plate for 5 minutes at 200° C. to obtain a hydrophobic film. The water contact angle as measured by the contact angle analyzer for Examples 30-33 are provided in Table 18.

A UMT-2 Tribometer from CETR was used to scratch each piece of display glass. The scratching process used a 5N weight, a hard fibrous scratching head, a 15 mm distance, a 10 mmis speed, and 500 repetitions (750 seconds). The water contact angle of each coating was measured by the contact analyzer following the scratching process. The results are shown in Table 18.

TABLE 18

Contact Angles and Abrasion for Examples 30-33

| Example | Water Contact Angle (°) Before Scratch Test | Water Contact Angle (°) After Scratch Test | Oleic Acid Contact Angle (°) Before Scratch Test | Oleic Acid Contact Angle (°) After Scratch Test |
|---|---|---|---|---|
| Example 30 | 125 | 101 | 87 | 71 |
| Example 31 | 129 | 102 | 88 | 71 |
| Example 32 | 152 | 102 | 90 | 71 |
| Example 33 | 102-120 | 101 | 71-83 | 71 |

5. Polymerization of —Si(OCH$_2$CH$_3$)$_3$ Endcapped Perfluoropolyether with a Lubricant For example 34, —Si(OCH$_2$CH$_3$)$_3$ endcapped perfluoropolyether (Fluorolink S10 from Solvay) and non-endcapped perfluoropolyether having an approximate molecular weight of 7000 (commercially available as Krytox GPL107 from Dupont, a completely saturated perfluoropolyether) were added to ethoxynonafluorobutane (Novec 7200 from 3M) in the amounts indicated in Table 19, and the solution was stirred to homogeneous at 25° C. for 10 minutes, then a transparent liquid was produced.

TABLE 19

Formulation of Examples 34

| | Ex. 34 |
|---|---|
| Fluorolink S10 | 8 |
| GPL-107 (g) | 2 |
| HFE-7200 (g) | 40 |

For example 35, —Si(OCH$_2$CH$_3$)$_3$ endcapped perfluoropolyether (Fluorolink 510 from Solvay) and none endcapped perfluoropolyether having an approximate molecular weight of 7000(commercially available as GPL107 from Dupont) were added to ethoxynonafluorobutane (Novec 7200 from 3M) in the amounts indicated in Table 20, and the solution was stirred to homogeneous at 25° C. for 10 minutes. 1M TBAH/Methanol (1 mon/L tetrabutylammonium hydroxide in methanol, available from Sigma-Aldrich) was diluted with ethanol to 10% mass fraction, the 10% mass fraction 1M TBAH/Methanol was added as a catalyst, and the solution was stirred to homogeneous at 25° C. for 10 minutes , then a transparent liquid was produced.

TABLE 20

Formulation of Examples 35

|  | Ex. 35 |
| --- | --- |
| Fluorolink S10 (g) | 6.0 |
| GPL-107 (g) | 1.0 |
| 10% 1M TBAH/Methanol in ethanol (g) | 2.3 |
| HFE-7200 (g) | 25.7 |

For example 36, —Si(OCH$_2$CH$_3$)$_3$ endcapped perfluoropolyeiher (Fluorolink S10 from Solvay) was added to ethoxynonafluorobutane(Novec 7200 from 3M) in the amounts indicated in Table 21, and the solution was stirred to homogeneous at 25° C. for 10 minutes, then a transparent liquid was produced.

For example 37, —Si(OCH$_2$CH$_3$)$_3$ endcapped perfluoropolyether (Fluorolink S10 from Solvay) was added to ethoxynonafluorobutane(Novec 7200 from 3M) in the amounts indicated in Table 21, and the solution was stirred to homogeneous at 25° C. for 10 minutes. 1M TBAH/Methanol (1 mol/L tetrabutylammonium hydroxide in methanol, available from Sigma-Aldrich) was diluted with ethanol to 0.385% mass fraction, the 0.385% mass fraction 1M TBAH/Methanol was added as a catalyst, and the solution was stirred to homogeneous at 25° C. for 10 minutes then a transparent liquid was produced.

For example 38, —Si(OCH$_2$CH$_3$)$_3$ endcapped perfluoropolyether (Fluorolink S10 from Solvay) and none endcapped perfluoropolyether having an approximate molecular weight of 7000(commercially available as GPL107 from Dupont) were added to ethoxynonafluorobutane(Novec 7200 from 3M) in the amounts indicated in Table 21, and the solution was stirred to homogeneous at 25° C. for 10 minutes. 1M TBAH/Methanol (1mol/L tetrabutylammonium hydroxide in methanol, available from Sigma-Aldrich) was diluted with ethanol to 0.385% mass fraction, the 0.385% mass fraction 1M TBAH/Methanol was added as a catalyst, and the solution was stirred to homogeneous at 25° C. for 10 minutes , then a transparent liquid was produced.

TABLE 21

Formulation of Examples 36-38

|  | Ex. 36 | Ex. 37 | Ex. 38 |
| --- | --- | --- | --- |
| Fluorolink S10 (g) | 0.06 | 0.06 | 0.06 |
| 0.385% 1M TBAH/Methanol in ethanol | — | 0.60 | 0.60 |
| GPL-107 (g) | — | — | 0.015 |
| HFE-7200 (g) | 29.94 | 29.34 | 29.325 |

PVD capsules were made from example 34-35, solid loading for each capsule was 50 mg. SiO$_2$ with the thickness of 25nm was PVD (Physical Vapor Deposition) coated as primer layer on a 70 mm by 70 mm display glass piece as previously indicated. Examples 34-35 were PVD coated on the SiO$_2$ primer layer from capsules by a PVD chamber produced by Chengdu Nanyi Equipment Co., Ltd. The temperate of chamber was 80° C., pressure was 10$^{-3}$ Pa. The water contact angle and oleic acid contact angle as measured by the contact angle analyzer for Examples 34-35 are provided in Table 22.

A 1.5 mL sample of each example 36-38 was spin coated on a 70 mm by 70 mm display glass piece as previously indicated. The samples were cured by hot plate for 10 minutes at 200° C. to obtain a hydrophobic film. The water contact angle and oleic acid contact angle as measured by the contact angle analyzer for Examples 36-38 are provided in Table 22.

The dynamic friction coefficient for Example 34-38 was measured using a GM-1 Coefficient of Friction Tester from Guangzhou Biaoji Packaging Equipment Co., Ltd. The friction material was Double A paper. The dynamic friction coefficient is provided in Table 22.

A CX-M-100 Tribometer from Shenzhen Changxu Equipment Co., Ltd was used to scratch each piece of display glass. The scratching process used a 5N weight, a steel wool scratching head, an 80 mm distance, a 160 mm/s speed, and 3000 repetitions (1500 seconds). The water contact angle of each coating was measured by the contact analyzer following the scratching process. The results of Example 34-38 are shown in Table 22.

TABLE 22

Contact Angles and Abrasion for Examples 34-38

| Example | Water Contact Angle (°) Before Scratch Test | Oleic Acid Contact Angle (°) Before Scratch Test | Water Contact Angle (°) After Scratch Test | Dynamic Friction Coefficient |
| --- | --- | --- | --- | --- |
| Example 34 | 102-105 | 71-72 | 70-99 | 0.05-0.13 |
| Example 35 | 101-103 | 71-72 | 70-99 | 0.05-0.13 |
| Example 36 | 97-100 | 66-68 | 20-40 | 0.21-0.27 |
| Example 37 | 100-103 | 67-69 | 30-50 | 0.20-0.22 |
| Example 38 | 105-109 | 72-73 | 70-98 | 0.12-0.17 |

As seen in Table 22, Examples 34, 35, and 38, which included the non-endcapped perfluoropolyether lubricant resulted in significantly higher water contact angle after the scratch test, and a significantly lower dynamic friction coefficient.

C. Mixtures of Polymerized 1H, 1H, 2H, 2H-perfluorooctyltriethoxysilane and polymerized —Si(OCH$_2$CH$_3$)$_3$ Endcapoed Perfluoropolyether For examples 15-17, a sample of Example 7 (acid-catalyzed polymerized 1H, 1H, 2H, 2H-perfluorooctyltriethoxysilane in 1,1,1,3,3-pentafluorobutane solvent) in was combined with a sample of Example 14 (polymerized —Si(OCH$_2$CH$_3$)$_3$ endcapped perfluoropolyether in a mixed ethanol and 1,1,1,3,3-pentafluorobutane solvent) in the amounts provided in Table 23. Each mixture was magnetically stirred for three hours.

TABLE 23

Formulation of Examples 15-17

| | Ex. 15 | Ex. 16 | Ex. 17 |
|---|---|---|---|
| Example 7 (g) | 45 | 30 | 15 |
| Example 14 (g) | 15 | 30 | 45 |

A 1.5 mi., sample of each example 7 and 14-17 was spin coated on a 70 mm by 70 mm display glass piece as previously indicated, The samples were cured by hot plate for 10 minutes at 150° C. to obtain a hydrophobic film. The water contact angle as measured by the contact angle analyzer for Examples 7 and 14-17 are provided in Table 24.

A UMT-2 Triborneter from CETR was used to scratch each piece of display glass. The scratching process used a 5N weight, a hard fibrous scratching head, a 15 mm distance, a 10 mm/s speed, and 500 repetitions (750 seconds). The water contact angle of each coating was measured by the contact analyzer following the scratching process. The results are shown in Table 24.

TABLE 24

Contact Angle Before and After Scratch Test

| Example | Water Contact Angle (°) Before Scratch Test | Water Contact Angle (°) After Scratch Test |
|---|---|---|
| Example 7 | 120 | 90 |
| Example 14 | 96 | 96 |
| Example 15 | 109 | 88 |
| Example 16 | 100 | 97 |
| Example 17 | 95 | 88 |

D. Co-polymerized 1H, 1H, 2H, 2H-Perfluorooctyltriethoxysilane and —Si(OCH$_2$CH$_3$)$_3$ Endcapped Perfluoropolyether For Example 18, 1H,1H,2H,2H-perfluorooctyltriethoxysilane (F8261 from Evonik Degussa) and —Si(OC2H5)3 endcapped perfluoropolyether (Fluorolink S10 from Solvay) were mixed with the solvents ethanol and ethoxynonafluorobutane (Novec 7200 from 3M) in the amounts indicated in Table 25. Water was added and the mixture was magnetically stirred for 10 minutes. Acetic acid was then added dropwise with a burette and the mixture was stirred for an additional 20 minutes. The stir speed was set to 300 rpm and temperature increased to 74° C. and stirred for 6 hours to produce an acid-catalyzed polymerization reaction.

TABLE 25

Formulation of Example 18

| | Ex. 18 |
|---|---|
| Ethanol (g) | 3.2 |
| 3M Novec 7200 (g) | 60.8 |
| Deionized water (g) | 2 |
| F8261 (g) | 1 |
| Fluorolink S10 (g) | 1 |
| Acetic acid (g) | 5 |

A 1.5 mL sample of example 18 was spin coated on a 70 mm by 70 mm display glass piece as previously indicated. The samples were cured by hot plate for 10 minutes at 150° C. to obtain a hydrophobic film. The water contact angle as measured by the contact angle analyzer for Example is provided in Table 26.

TABLE 26

Contact Angle

| Example | Water Contact Angle (°) |
|---|---|
| Example 18 | 98 |

While this invention has been described as having exemplary designs, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fail within the limits of the appended claims.

The invention claimed is:

1. A composition for forming a poly fluorine-containing siloxane coating comprising:

a polymer of Formula (I):

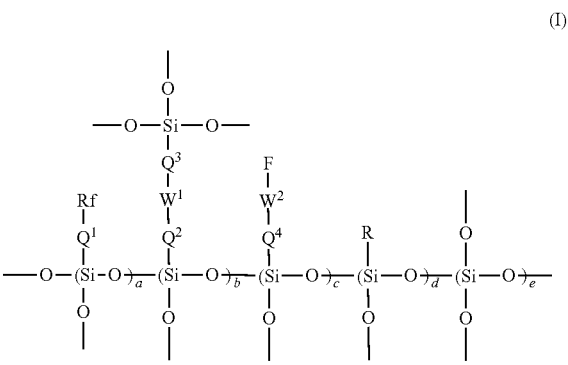

wherein:

R is a hydrogen atom, an alkyl or aryl group having 1 to 10 carbon atoms, a fluorine-substituted alkyl or aryl group having 1 to 10 carbon atoms;

Rf is a linear or branched perfluoro-alkyl group represented by the formula F—C$_g$F$_{2g}$)—, where g is an integer from 1 to 10;

$W^1$, $W^2$ are each independently a perfluoroether-containing organic group;

$Q^1$, $Q^2$, $Q^3$, $Q^4$ are each independently an organic linking group linking a Si element to a fluorinated group, wherein $Q^1$, $Q^2$, $Q^3$, $Q^4$ are independently represented by an isolated repeated formula selected from the group consisting of: —CH$_2$—, —OCONH—, —COO—, —CONH—, —CH$_2$O—, —CH(CH$_3$)—, —(CH$_3$)$_2$—, and —(Si(CH$_3$)$_2$O)$_h$—Si(CH$_3$)$_2$—, wherein h is independently an integer from 0 to 10 for each of $Q^1$, $Q^2$, $Q^3$, $Q^4$; and wherein each R is independently selected from the group consisting of H, CH$_3$, and CHF$_2$; and a, c, d, e are each independently an integer from 0 to 1000, b is an integer from 1 to 1000; the sum of the integers a, b, and c being greater than or equal to 2;

at least one organic solvent;

colloidal silica; and optionally at least one additive.

2. The composition of claim 1, wherein $W^1$, $W^2$ are independently represented by the Formula (II):

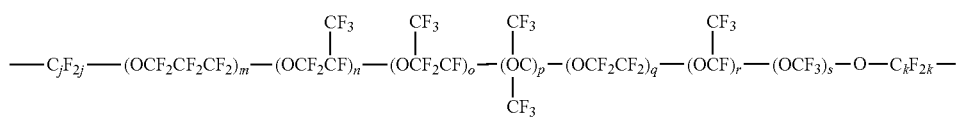

wherein $C_jF_{2j}$ and $C_kF_{2k}$ are independently a linear or branched perfluoro-alkyl group;

j is an integer from 1 to 10;

k is an integer from 1 to 10; and m, n, o, p, q, r, s are each independently an integer from 0 to 100.

3. The composition of claim 1, wherein c is an integer from 1 to 1000 and $W^1$, $W^2$ are selected from the groups represented by Formula (III) and Formula (IV):

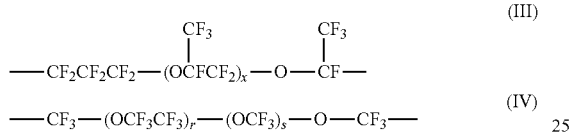

wherein x, y, z are each independently an integer from 1 to 100 and $W^1$ and $W^2$ are not represented by the same Formula (III) and Formula (IV).

4. The composition of claim 1, wherein the organic solvent includes at least one non-fluorine-containing solvent selected from group consisting of: isopropyl alcohol, ethanol, methanol, acetone, tetrahydrofuran, propylene glycol monomethyl ether, propylene glycol methyl ether acetate, and dipropylene glycol monomethyl ether.

5. The composition of claim 1, wherein the organic solvent includes at least one fluorine-containing solvent selected from the group consisting of: ethyl nonafluorobutyl ether, methyl nonafluorobutyl ether, 1,1,1,3,3-pentafluorobutane, tetrafluoro-1-propanol, octafluoropentanol, trifluoroacetic acid, decafluoropentane, and ethoxynonafluorobutane.

6. The composition of claim 1, comprising at least one additive selected from the group consisting of: water, a crosslinker, a catalyst, nanosize particles, a surfactant, and a lubricant.

7. The composition of claim 6, wherein the crosslinker is selected from the group consisting of polyphosphazene, glycoluril, melamine, benzoguanamine, urea, and combinations thereof; wherein the catalyst is selected from the group consisting of acid catalysts, alkaline catalysts, metal-organic catalysts, tetraalkylammonium salt catalyst, and combinations thereof wherein the lubricant is selected from perfluoropolyether, silicon and combinations thereof and wherein the nanosize particles are selected from the group consisting of nanosize organic particles, nanosize inorganic particles, and combinations thereof.

8. The composition of claim 7, wherein the nanosize organic particles are selected from the group consisting of polyethylene (PE) nanoparticles, polychlorotrifluoroethylene (PCTFE) nanoparticles, polytetrafluoroethylene (PTFE), nanoparticles, and combinations, thereof and wherein the nanosize inorganic particles are selected from the group consisting of silica, alumina, titania, zirconia, colloidal silica, silicon nitride, boron nitride, and combinations thereof.

9. The composition of claim 1, further including at least one perfluoropolyether lubricant.

10. A composition for forming a poly fluorine-containing siloxane coating comprising:

a polymer of Formula (I):

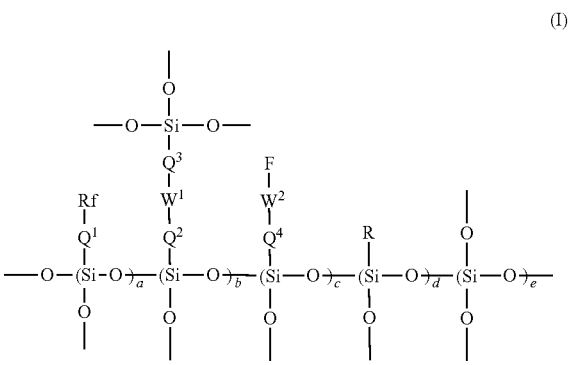

wherein:

R is a hydrogen atom, an alkyl or aryl group having 1 to 10 carbon atoms, a fluorine-substituted alkyl or aryl group having 1 to 10 carbon atoms;

Rf is a linear or branched perfluoro-alkyl group represented by the formula $F-(C_gF_{2g})-$, where g is an integer from 1 to 10;

$W^1$, $W^2$ are each independently a perfluoroether-containing organic group;

$Q^1$, $Q^2$, $Q^3$, $Q^4$ are each independently an organic linking group linking a Si element to a fluorinated group; and a, d, e are each independently an integer from 0 to 1000, b, c are each independently an integer from 1 to 1000;

at least one organic solvent; and optionally at least one additive.

11. The composition of claim 10, wherein $Q^1$, $Q^2$, $Q^3$, $Q^4$ are independently represented by an isolated repeated formula selected from the group consisting of:

—$CH_2$—,

—OCONH—, —COO—, —CONH—, 13 $CH_2O$—, —$CH(CH_3)$—, —$C(CH_3)_2$—, and —$(Si(CH_3)_2O)_h$—$Si(CH_3)_2$—, wherein h is independently an integer from 0 to 10 for each of $Q^1$, $Q^2$, $Q^3$, $Q^4$; and wherein each R is independently selected from the group consisting of H, $CH_3$, and $CHF_2$.

12. The composition of claim 10, wherein $W^1$, $W^2$ are independently represented by the Formula (II):

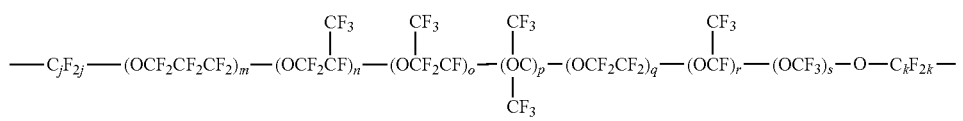
(II)

wherein $C_jF_{2j}$ and $C_kF_{2k}$ are independently a linear or branched perfluoro-alkyl group;

j is an integer from 1 to 10;

k is an integer from 1 to 10; and m, n, o, p, q, r, s are each independently an integer from 0 to 100.

13. The composition of claim 10, wherein $W^1$, $W^2$ are independently selected from the groups represented by Formula (III) and Formula (IV):

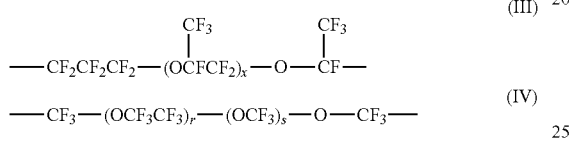

wherein x, y, z are each independently an integer from 1 to 100.

14. The composition of claim 10, wherein the organic solvent includes at least one non-fluorine-containing solvent selected from group consisting of: isopropyl alcohol, ethanol, methanol, acetone, tetrahydrofuran, propylene glycol monomethyl ether, propylene glycol methyl ether acetate, and dipropylene glycol monomethyl ether.

15. The composition of claim 10, wherein the organic solvent includes at least one fluorine-containing solvent selected from the group consisting of: ethyl nonafluorobutyl ether, methyl nonafluorobutyl ether, 1,1,1,3,3-pentafluorobutane, tetrafluoro-1-propanol, octafluoropentanol, trifluoroacetic acid, decafluoropentane, and ethoxynonafluorobutane.

16. The composition of claim 10, comprising at least one additive selected from the group consisting of: water, a crosslinker, a catalyst, nanosize particles, a surfactant, and a lubricant.

17. The composition of claim 16, wherein the crosslinker is selected from the group consisting of polyphosphazene, glycoluril, melamine, benzoguanamine, urea, and combinations thereof; wherein the catalyst is selected from the group consisting of acid catalysts, alkaline catalysts, metal-organic catalysts, tetraalkylammonium salt catalyst, and combinations thereof wherein the lubricant is selected from perfluoropolyether, silicon and combinations thereof and wherein the nanosize particles are selected from the group consisting of nanosize organic particles, nanosize inorganic particles, and combinations thereof.

18. The composition of claim 17, wherein the nanosize organic particles are selected from the group consisting of polyethylene (PE) nanoparticles, polychlorotrifluoroethylene (PCTFE) nanoparticles, polytetrafluoroethylene (PTFE), nanoparticles, and combinations, thereof and wherein the nanosize inorganic particles are selected from the group consisting of silica, alumina, titania, zirconia, colloidal silica, silicon nitride, boron nitride, and combinations thereof.

19. The composition of claim 10, further comprising colloidal silica, wherein the composition further includes at least one perfluoropolyether lubricant.

20. A composition for forming a poly fluorine-containing siloxane coating comprising:

a polymer of Formula (I):

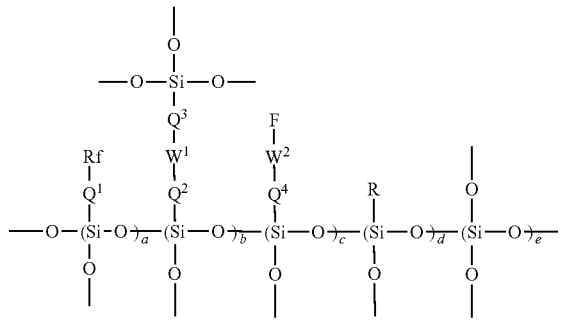

wherein:

R is a hydrogen atom, an alkyl or aryl group having 1 to 10 carbon atoms, a fluorine-substituted alkyl or aryl group having 1 to 10 carbon atoms;

Rf is a linear or branched perfluoro-alkyl group represented by the formula F—$(C_gF_{2g})$—, where g is an integer from 1 to 10;

$W^1$, $W^2$ are each independently a perfluoroether-containing organic group selected from the groups represented by Formula (III) and Formula (IV):

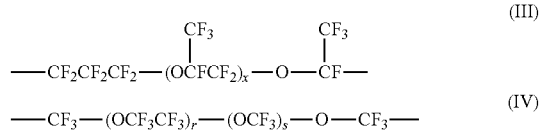

wherein x, y, z are each independently an integer from 1 to 100 and $W^1$ and $W^2$ are not represented by the same Formula (III) and Formula (IV);

$Q^1$, $Q^2$, $Q^3$, $Q^4$ are each independently an organic linking group linking a Si element to a fluorinated group; and a, d, e are each independently an integer from 0 to 1000, b is an integer from 1 to 1000, c is an integer from 1 to 1000;

at least one organic solvent;

colloidal silica; and optionally at least one additive.

* * * * *